(12) United States Patent
Hosseini et al.

(10) Patent No.: US 11,785,581 B2
(45) Date of Patent: Oct. 10, 2023

(54) SPAN-BASED CONTROL CHANNEL FOR MULTIPLE TRANSMIT RECEIVE POINTS

(71) Applicant: QUALCOMM Incorporated, San Diego, CA (US)

(72) Inventors: Seyedkianoush Hosseini, San Diego, CA (US); Mostafa Khoshnevisan, San Diego, CA (US); Seyed Ali Akbar Fakoorian, San Diego, CA (US); Wei Yang, San Diego, CA (US); Wanshi Chen, San Diego, CA (US); Peter Gaal, San Diego, CA (US); Hwan Joon Kwon, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/223,653

(22) Filed: Apr. 6, 2021

(65) Prior Publication Data
US 2021/0321366 A1    Oct. 14, 2021

Related U.S. Application Data

(60) Provisional application No. 63/008,596, filed on Apr. 10, 2020.

(51) Int. Cl.
*H04W 72/00* (2023.01)
*H04W 72/02* (2009.01)
(Continued)

(52) U.S. Cl.
CPC ............ *H04W 72/02* (2013.01); *H04L 1/0038* (2013.01); *H04L 27/26025* (2021.01);
(Continued)

(58) Field of Classification Search
None
See application file for complete search history.

(56) References Cited

U.S. PATENT DOCUMENTS

| 2019/0036665 A1* | 1/2019 | Park ...................... H04L 5/0091 |
| 2022/0167375 A1* | 5/2022 | Papasakellariou .... H04L 5/0053 |

OTHER PUBLICATIONS

3GPP, TSG RAN WG1 #100 R1-2000625, Mar. 2020.*

(Continued)

*Primary Examiner* — Abdelillah Elmejjarmi
(74) *Attorney, Agent, or Firm* — Harrity & Harrity, LLP

(57) ABSTRACT

Various aspects of the present disclosure generally relate to wireless communication. In some aspects, a user equipment may receive configuration information for a plurality of carriers, wherein a set of first carriers of the plurality of carriers are single transmit receive point (single-TRP) carriers and a set of second carriers of the plurality of carriers are multi-TRP carriers; determine, for the plurality of carriers, a distribution that satisfies a per-span capability of the UE, wherein the distribution is of at least one of a plurality of non-overlapped control channel elements or a plurality of blind decodes, wherein the distribution is based at least in part on which carriers, of the plurality of carriers, are single-TRP carriers or multi-TRP carriers; and receive communications on the plurality of carriers in accordance with the distribution. Numerous other aspects are provided.

30 Claims, 7 Drawing Sheets

(51) Int. Cl.
*H04W 72/0453* (2023.01)
*H04W 8/24* (2009.01)
*H04W 24/08* (2009.01)
*H04L 27/26* (2006.01)
*H04L 1/00* (2006.01)
*H04W 72/53* (2023.01)

(52) U.S. Cl.
CPC .............. *H04W 8/24* (2013.01); *H04W 24/08* (2013.01); *H04W 72/0453* (2013.01); *H04W 72/53* (2023.01)

(56) References Cited

OTHER PUBLICATIONS

3GPP TS 38.213: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis, Cedex, France, vol. RAN WG1, No. V16.0.0, Dec. 2019, Jan. 14, 2020 (Jan. 14, 2020), XP051860806, pp. 1-146, Retrieved from the Internet: URL: http://ftp.3gpp.org/Specs/archive/38_series/38.213/38213-g00.zip 38213-g00.docx [retrieved on Jan. 14, 2020], section 7.6.2, Section 10, Section 10.1, p. 100, Section 10.3, Paragraph [09.1], clause 7.2.1, p. 23-p. 25, clause 9, p. 4 9, paragraph 3 clause 9.1, p. 49, paragraph 4-paragraph 15 clause 9.1.1, p. 50, paragraph 5-paragraph 6 clause 9.1.2.1, p. 55 clause 9.1.3, p. 57, paragraph 8 clause 9.1.3.1, p. 61, paragraph 1-paragraph 2 clause 9.1.3.2, p. 63, paragraph 6 clause 9.1.3.3, p. 64, paragraph 1—p. 65, paragraph 10, p. 56. paragraph 6—p. 57, paragraph 1 ch , 9.2.3, p. 73, paragraph, 5 p. 44, paragraph 8, p. 10, paragraph 1 p. 105-p. 106, tables 10.2-1. 10.2-2, paragraph [9.2.5].
International Search Report and Written Opinion—PCT/US2021/026231—ISA/EPO—dated Jun. 11, 2021.
Samsung: "Remaining Issues for PDCCH Enhancements", 3GPP TSG RAN WG1 #100, 3GPP Draft, R1-2000625, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020 Feb. 15, 2020 (Feb. 15, 2020), pp. 1-6, XP051853382, Retrieved from the Internet: URL: https://www.3gpp.org/ftp/tsg_ran/WG1_RL1/TSGR1_100_e/Docs/R1-2000625.zip, R1-2000625 eURLLC DL control. docx [retrieved on Feb. 15, 2020] Section 2; pp. 2,4.

* cited by examiner

US 11,785,581 B2

SPAN-BASED CONTROL CHANNEL FOR MULTIPLE TRANSMIT RECEIVE POINTS

CROSS-REFERENCE TO RELATED APPLICATION

This patent application claims priority to U.S. Provisional Patent Application No. 63/008,596, filed on Apr. 10, 2020, entitled "SPAN-BASED CONTROL CHANNEL FOR MULTIPLE TRANSMIT RECEIVE POINTS," and assigned to the assignee hereof. The disclosure of the prior Application is considered part of and is incorporated by reference into this patent Application.

FIELD OF THE DISCLOSURE

Aspects of the present disclosure generally relate to wireless communication and to techniques and apparatuses for a span-based control channel for multiple transmit receive points (TRPs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving configuration information for a plurality of carriers, wherein a set of first carriers of the plurality of carriers are single transmit receive point (single-TRP) carriers and a set of second carriers of the plurality of carriers are multi-TRP carriers; determining, for the plurality of carriers, a distribution that satisfies a per-span capability of the UE, wherein the distribution is of at least one of a plurality of non-overlapped control channel elements (CCEs) or a plurality of blind decodes (BDs), wherein the distribution is based at least in part on which carriers, of the plurality of carriers, are single-TRP carriers or multi-TRP carriers; and receiving communications on the plurality of carriers in accordance with the distribution.

In some aspects, a method of wireless communication, performed by a base station, may include transmitting, to a UE, configuration information for a plurality of carriers, wherein a set of first carriers of the plurality of carriers are single-TRP carriers and a set of second carriers of the plurality of carriers are multi-TRP carriers; determining, for the plurality of carriers, a distribution that satisfies a per-span capability of the UE, wherein the distribution is of at least one of a plurality of non-overlapped CCEs or a plurality of blind decodes, wherein the distribution is based at least in part on which carriers, of the plurality of carriers, are single-TRP carriers or multi-TRP carriers; and transmitting communications on the plurality of carriers in accordance with the distribution.

In some aspects, a user equipment for wireless communication may include a memory and one or more processors operatively coupled to the memory. The memory and the one or more processors may be configured to receive configuration information for a plurality of carriers, wherein a set of first carriers of the plurality of carriers are single-TRP carriers and a set of second carriers of the plurality of carriers are multi-TRP carriers; determine, for the plurality of carriers, a distribution that satisfies a per-span capability of the UE, wherein the distribution is of at least one of a plurality of non-overlapped CCEs or a plurality of blind decodes, wherein the distribution is based at least in part on which carriers, of the plurality of carriers, are single-TRP carriers or multi-TRP carriers; and receive communications on the plurality of carriers in accordance with the distribution.

In some aspects, a base station for wireless communication may include a memory and one or more processors operatively coupled to the memory. The memory and the one or more processors may be configured to transmit, to a UE, configuration information for a plurality of carriers, wherein a set of first carriers of the plurality of carriers are single-TRP carriers and a set of second carriers of the plurality of carriers are multi-TRP carriers; determine, for the plurality of carriers, a distribution that satisfies a per-span capability of the UE, wherein the distribution is of at least one of a plurality of non-overlapped CCEs or a plurality of blind decodes, wherein the distribution is based at least in part on which carriers, of the plurality of carriers, are single-TRP carriers or multi-TRP carriers; and transmit communications on the plurality of carriers in accordance with the distribution.

In some aspects, a non-transitory computer-readable medium may store one or more instructions for wireless communication. The one or more instructions, when executed by one or more processors of a UE, may cause the one or more processors to receive configuration information for a plurality of carriers, wherein a set of first carriers of the plurality of carriers are single-TRP carriers and a set of second carriers of the plurality of carriers are multi-TRP carriers; determine, for the plurality of carriers, a distribution that satisfies a per-span capability of the UE, wherein the distribution is of at least one of a plurality of non-overlapped CCEs or a plurality of blind decodes, wherein the distribution is based at least in part on which carriers, of the plurality of carriers, are single-TRP carriers or multi-TRP carriers; and receive communications on the plurality of carriers in accordance with the distribution.

In some aspects, a non-transitory computer-readable medium may store one or more instructions for wireless communication. The one or more instructions, when executed by one or more processors of a base station, may cause the one or more processors to transmit, to a UE, configuration information for a plurality of carriers, wherein a set of first carriers of the plurality of carriers are single-TRP carriers and a set of second carriers of the plurality of carriers are multi-TRP carriers; determine, for the plurality of carriers, a distribution that satisfies a per-span capability of the UE, wherein the distribution is of at least one of a plurality of non-overlapped CCEs or a plurality of blind decodes, wherein the distribution is based at least in part on which carriers, of the plurality of carriers, are single-TRP carriers or multi-TRP carriers; and transmit communications on the plurality of carriers in accordance with the distribution.

In some aspects, an apparatus for wireless communication may include means for receiving configuration information for a plurality of carriers, wherein a set of first carriers of the plurality of carriers are single-TRP carriers and a set of second carriers of the plurality of carriers are multi-TRP carriers; means for determining, for the plurality of carriers, a distribution that satisfies a per-span capability of the UE, wherein the distribution is of at least one of a plurality of non-overlapped CCEs or a plurality of blind decodes, wherein the distribution is based at least in part on which carriers, of the plurality of carriers, are single-TRP carriers or multi-TRP carriers; and means for receiving communications on the plurality of carriers in accordance with the distribution.

In some aspects, an apparatus for wireless communication may include means for transmitting, to a UE, configuration information for a plurality of carriers, wherein a set of first carriers of the plurality of carriers are single-TRP carriers and a set of second carriers of the plurality of carriers are multi-TRP carriers; means for determining, for the plurality of carriers, a distribution that satisfies a per-span capability of the UE, wherein the distribution is of at least one of a plurality of non-overlapped CCEs or a plurality of blind decodes, wherein the distribution is based at least in part on which carriers, of the plurality of carriers, are single-TRP carriers or multi-TRP carriers; and means for transmitting communications on the plurality of carriers in accordance with the distribution.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
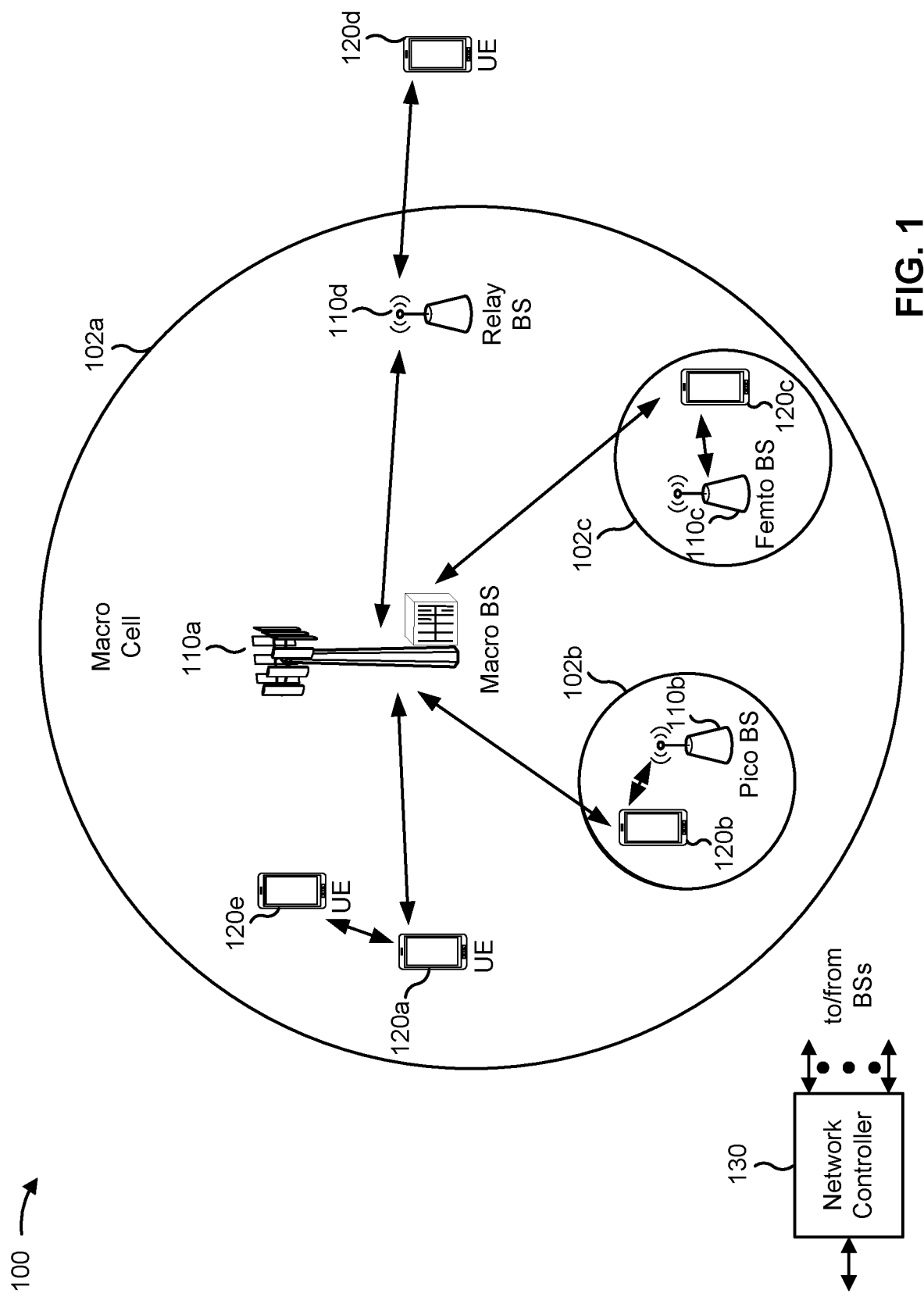
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
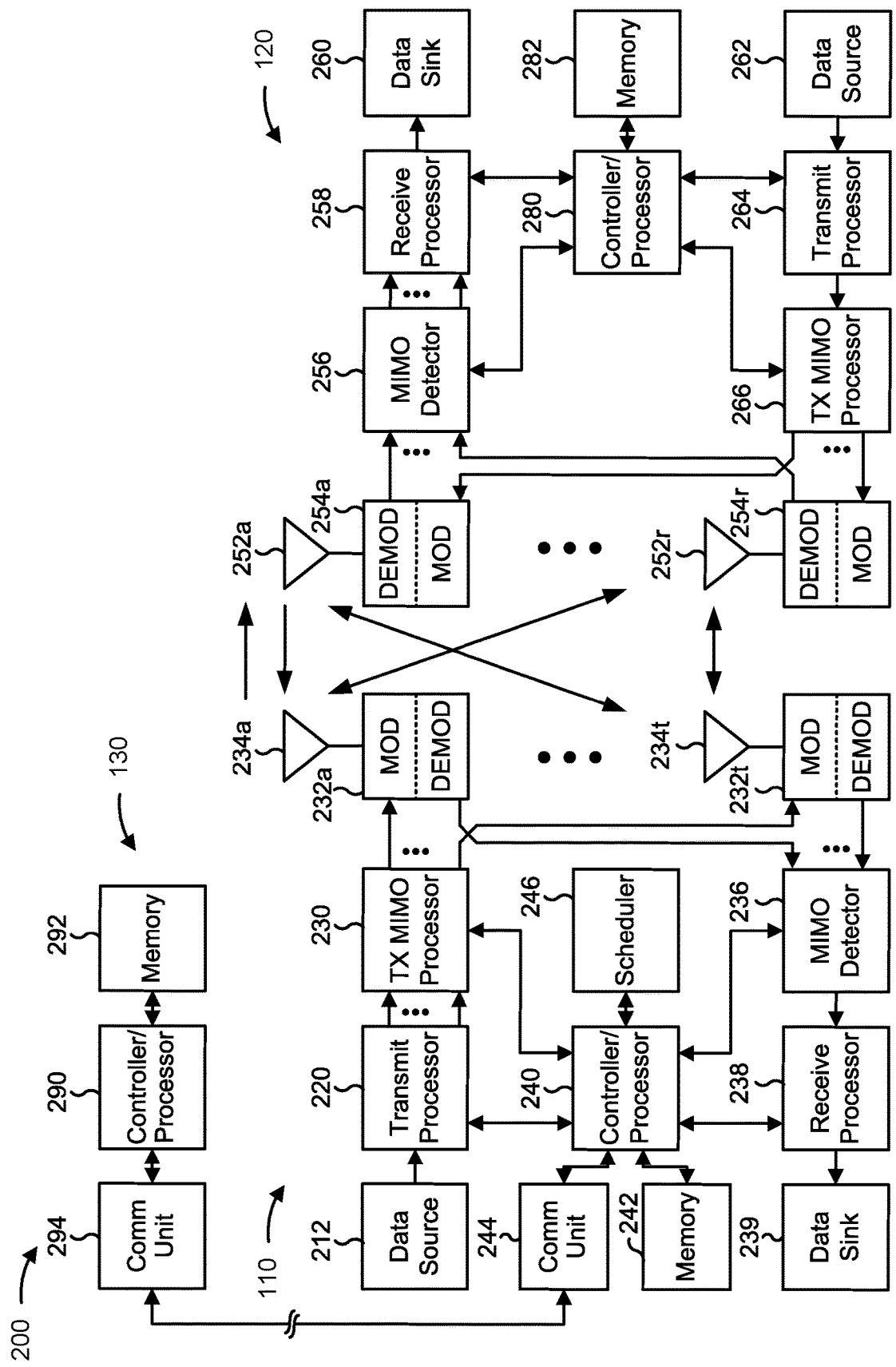
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with a span-based control channel for multiple TRPs, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving configuration information for a plurality of carriers, wherein a set of first carriers of the plurality of carriers are single-TRP carriers and a set of second carriers of the plurality of carriers are multi-TRP carriers; means for determining, for the plurality of carriers, a distribution that satisfies a per-span capability of the UE, wherein the distribution is of at least one of a plurality of non-overlapped control channel elements (CCEs) or a plurality of blind decodes (BDs), wherein the distribution is based at least in part on which carriers, of the plurality of carriers, are single-TRP carriers or multi-TRP carriers; means for receiving communications on the plurality of carriers in accordance with the distribution; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, configuration information for a plurality of carriers, wherein a set of first carriers of the plurality of carriers are single-TRP carriers and a set of second carriers of the plurality of carriers are multi-TRP carriers; means for determining, for the plurality of carriers, a distribution that satisfies a per-span capability of the UE, wherein the distribution is of at least one of a plurality of non-overlapped CCEs or a plurality of blind decodes, wherein the distribution is based at least in part on which carriers, of the plurality of carriers, are single-TRP carriers or multi-TRP carriers; means for transmitting communications on the plurality of carriers in accordance with the distribution; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some RATs, such as 3GPP Release 15 of 5G/NR, different physical downlink control channel (PDCCH) monitoring capabilities are defined. As an example, a feature group (FG) 3-1 (which may be mandatory for Release 15 UEs to support) may indicate that the UE is capable of monitoring all PDCCH candidates for scheduling data that are within the first few symbols of a slot. As another example, an FIG. 3-5b (which may be optional for Release 15 UEs to support) may be defined based at least in part on a span concept. A slot can include multiple spans, and a span can include one or more PDCCH candidates. Different span configurations may be supported. Span configurations are described in more detail in connection with FIG. 3.

In a 5G/NR network, a base station transmits a PDCCH (which may include control information, such as downlink control information (DCI)) based at least in part on a search space set. A given search space set includes candidates that may carry a PDCCH within the search space set, where each candidate is associated with one or more CCEs. A CCE may be composed of multiple resource element groups (REGs). A REG may include one resource block and one OFDM symbol. One or more search space sets may be associated with a control resource set (CORESET). In a 5G/NR network, a base station may flexibly schedule and transmit the PDCCH. In other words, transmission of the PDCCH in the 5G/NR network is not limited to a particular set of frequency resources and/or time resources in a given radio frame, as in the case of, for example, an LTE network. PDCCH frequency domain and time domain resources are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set.

In order to receive a PDCCH associated with one or more candidates of a given UE-specific search space set (where a UE-specific search space set is a search space set that may carry control information specific to one or more particular UEs), a UE may attempt to decode a PDCCH in candidates of the search space set. For example, the UE may determine one or more CCE indices associated with a candidate, and may attempt to decode the PDCCH (e.g., using a blind decoding procedure). In some cases (e.g., 3GPP Release 15 of 5G/NR), limits on the number of non-overlapping CCEs and BDs are defined on a per-slot basis. Thus, a large number of CCEs/BDs (in the extreme case, all of them) may be configured within one span. This significantly increases the UE complexity, particularly when attempting to conform to processing timelines that are suitable for supporting ultra-reliable low latency communication (URLLC) applications. On the other hand, if the scheduler chooses to distribute the CCEs/BDs across different spans, the number of CCE/BDs per span may not be sufficient. For example, for a subcarrier spacing (SCS) of 30 kilohertz (kHz) and a span capability of (X,Y)=(2,2), each span can have 8 CCEs. Hence, only one candidate of aggregation level=8 can be supported. Span capabilities are described in more detail in connection with FIG. 3.

To address the above issues, 3GPP Release 16 of 5G/NR introduced a PDCCH monitoring capability that is based at least in part on a span configuration of the UE. To improve scheduling flexibility, the number of non-overlapping CCEs and BDs per slot is increased as compared to 3GPP Release 15 of 5G/NR. Furthermore, to relax the UE complexity, a per-span CCE/BD limit (also referred to as a per-span capability) may be specified. This PDCCH monitoring capability with CCE/BD limits defined per span may be referred to herein as a span-based monitoring capability or a Release 16 monitoring capability, whereas the PDCCH monitoring capability defined on a per-slot basis may be referred to as a slot-based monitoring capability or a Release 15 monitoring capability. In some aspects, a Release 16 PDCCH may be used for URLLC traffic types.

In some cases, the UE may be configured with a number of carriers that exceeds the threshold identified by the PDCCH monitoring capability. For example, if the UE is configured with both Release 15 and Release 16 PDCCHs across different carriers, and if the number of DL carriers exceeds the UE's capability for monitoring Release 15 PDCCHs and/or Release 16 PDCCHs, the number of non-overlapped CCEs to be received or BDs to be performed may exceed the UE's capabilities on one or more carriers. Therefore, it may be beneficial to split the CCEs and/or BDs across carriers with different PDCCH monitoring capabilities (e.g., slot-based versus span-based), different SCSs, and different span capabilities. However, there may be ambiguity as to how this distribution is to be performed, particularly in cases when the UE is configured with both Release 15 PDCCHs and Release 16 PDCCHs.

In some aspects, this distribution may be performed separately for a set of carriers associated with Release 16 PDCCHs and for a set of carriers associated with Release 15 PDCCHs. In this case, the UE or the BS may determine the number of non-overlapping CCEs or BDs across the carriers and per scheduled cell for the carriers configured with the Release 15 PDCCH and the Release 16 PDCCH separately. For carriers configured with the Release 15 PDCCH, a value $N_{cells}^{cap}$ may represent the number of component carriers (CCs) for which the UE can perform slot-based monitoring, and the distribution of BDs (e.g., represented by M in the following equations) and non-overlapped CCEs (e.g., represented by C in the following equations) may be determined as follows:

If a UE is configured with $N_{cells}^{DL,\mu}$ downlink cells with DL bandwidth parts (BWPs) having SCS configuration $\mu$ where $\Sigma_{\mu=0}^{3} N_{cells}^{DL,\mu} \leq N_{cells}^{cap}$, the UE is not required to monitor, on the active DL BWP of the scheduling cell, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell.

If a UE is configured with $N_{cells}^{DL,\mu}$ downlink cells with DL BWPs having SCS configuration $\mu$, where $\Sigma_{\mu=0}^{3} N_{cells}^{DL,\mu} > N_{cells}^{cap}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,slot,\mu} = \lfloor N_{cells}^{cap} \cdot M_{PDCCH}^{max,slot,\mu} \cdot N_{cells}^{DL,\mu} / \sum_{j=0}^{3} N_{cells}^{DL,j} \rfloor$ PDCCH candidates or more than $C_{PDCCH}^{total,slot,\mu} = \lfloor N_{cells}^{cap} \cdot C_{PDCCH}^{max,slot,\mu} \cdot N_{cells}^{DL,\mu} / \sum_{j=0}^{3} N_{cells}^{DL,j} \rfloor$ non-overlapped CCEs per slot on the active DL BWP(s) of scheduling cell(s) from the $N_{cells}^{DL,\mu}$ downlink cells.

For each scheduled cell, the UE is not required to monitor on the active DL BWP with SCS configuration μ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

A UE may communicate with multiple TRPs. More generally, the UE may receive CORESET configurations associated with two or more CORESET configurations (e.g., two or more CORESET pool indexes, where each CORESET pool index corresponds to a TRP). A TRP is a communication point associated with a gNB. For example, a gNB may control multiple TRPs, and may use the multiple TRPs for spatially diverse communication with a UE, or may use a single TRP for communication with a UE. However, there may be ambiguity as to how CCEs and/or BDs should be distributed for Release 16 carriers (e.g., carriers associated with a Release 16 PDCCH configuration and span-based monitoring) for a UE that can use a combination of single-TRP and multi-TRP carriers. For example, a multi-TRP carrier may use more resources of the UE (e.g., processing resources, reception resources, and so on) than a single-TRP carrier. Thus, challenges may arise with regard to how single-TRP and multi-TRP carriers are to be counted for purposes of distributing CCEs and/or BDs, how span-based overbooking and dropping should be performed, and so on. If the distribution of CCEs and/or BDs does not take into account the Release 16 PDCCH and the multi-TRP carriers, then a sub-optimal CCE/BD distribution may be determined and/or the capabilities of the UE may be exceeded, thereby using computing resources and battery power and decreasing throughput.

Some techniques and apparatuses described herein provide determination of a distribution for CCEs and/or BDs across a plurality of carriers that include at least one multi-TRP carrier. For example, some techniques and apparatuses described herein perform hard-splitting across carriers with different subcarrier spacings, hard-splitting across carriers configured with Release 15 and Release 16 PDCCHs, and hard-splitting across carriers configured with search space sets and/or CORESETs that are aligned with different span configurations. Then, a single-TRP set of carriers and a multi-TRP set of carriers may be defined, and CCE/BD distribution may be performed for these sets of carriers, thereby enabling conformance with UE capability limitations and improving network performance.

Some techniques and apparatuses described herein provide span-based overbooking and dropping rules for multi-TRP carriers, thereby enabling overbooking and dropping, which improves resource utilization on multi-TRP carriers. Some techniques and apparatuses described herein provide for separate span configurations for each TRP of a multi-TRP carrier, which improves flexibility of network configuration and enables the use of, for example, URLLC traffic and enhanced mobile broadband (eMBB) traffic on a same carrier. Furthermore, some techniques and apparatuses described herein provide a process for distributing CCEs and/or BDs based at least in part on whether span configurations of a multi-TRP carrier are aligned with each other. Thus, conformance with UE capability limitations is improved, thereby improving network performance.

It should be noted that the techniques described above and elsewhere herein as being performed for a first TRP and a second TRP of a multi-TRP communication can be performed for any set of CORESETs that are differentiated from each other based at least in part on a differentiation parameter. For example, the techniques and apparatuses described herein can be performed for a carrier associated with CORESETs of two or more different CORESET pool indexes, a carrier associated with CORESETs of two or more different timing capability indications, a carrier associated with CORESETs of two or more configurations based at least in part on indicated or configured parameters of the CORESETs, and so on.

Figure 3:
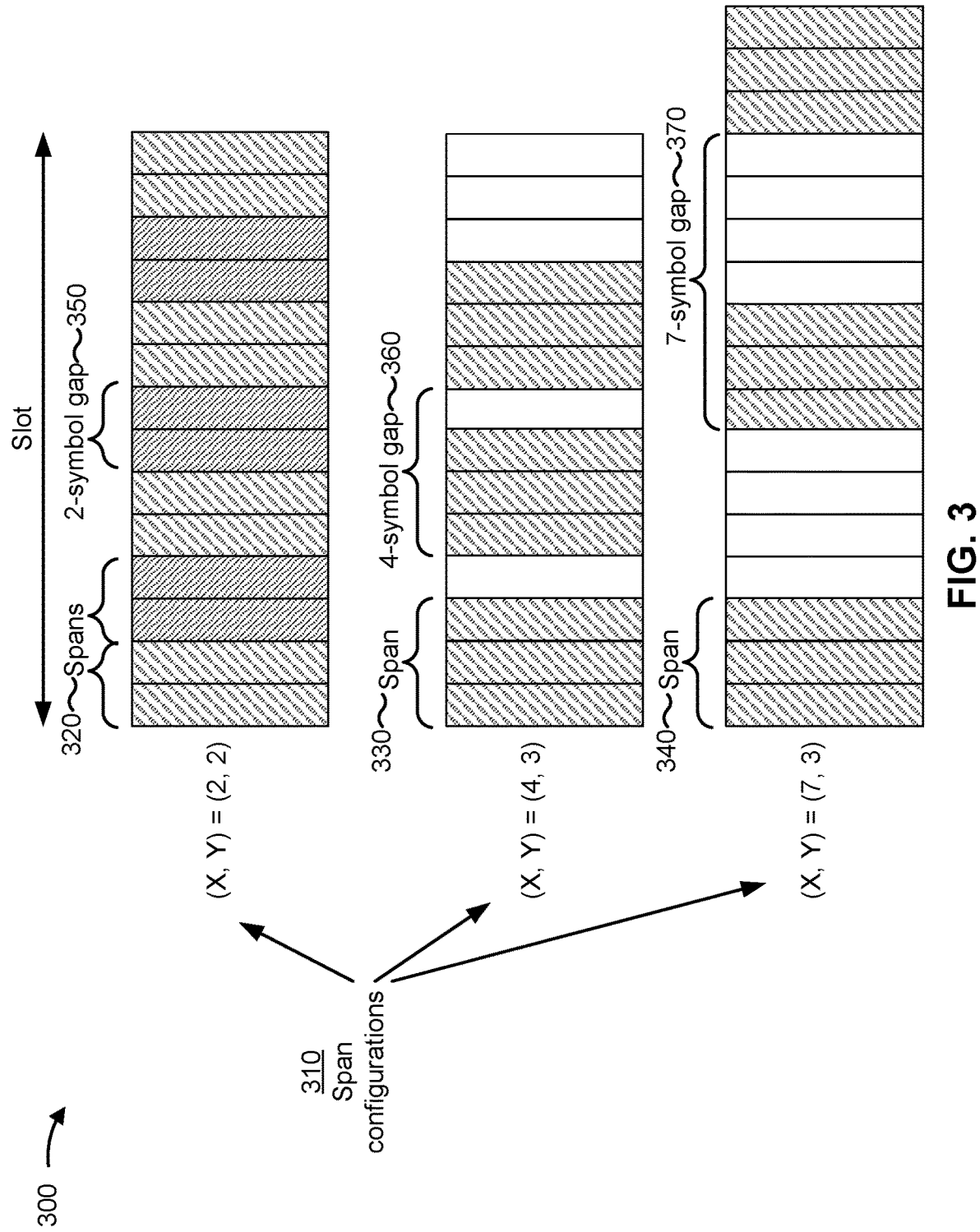
FIG. 3 is a diagram illustrating an example of spans in a slot for physical downlink control channel monitoring, in accordance with the present disclosure.

FIG. 3 is a diagram illustrating an example 300 of spans in a slot for physical downlink control channel monitoring, in accordance with the present disclosure. FIG. 3 shows a set of slots that are associated with respective span configurations, shown by reference number 310. A span configuration may identify a minimum gap X between the starting symbol of two spans and a maximum span duration Y.

The spans corresponding to span configurations (2, 2), (4, 3), and (7, 3) are shown by reference numbers 320, 330, and 340, respectively. The spans shown by reference number 320 are shown using alternating diagonal hatching, since these spans are adjacent to each other and would be difficult to differentiate otherwise. The spans shown by reference numbers 330 and 340 are separated by symbols that are not included in a span, which are shown by white rectangles.

The minimum gap X is shown for span configurations (2, 2), (4, 3), and (7, 3) by reference numbers 350, 360, and 370, respectively. It should be noted that X defines a minimum gap, so starting symbols of a pair of spans associated with span configuration (2, 2) may be two or more symbols apart from each other. Furthermore, the maximum span duration Y defines a maximum span duration, so the span 330 may have one-symbol or two-symbol spans while still being within the definition of the span configuration (4, 3).

A span configuration may be associated with a per-span capability for a number of BDs and/or a number of non-overlapped CCEs in a span. A per-span capability for a number of BDs may identify a maximum number of BDs that can be configured in a span 320/330/340, and a per-span capability for a number of non-overlapped CCEs may identify a maximum number of non-overlapped CCEs that can be configured in a span 320/330/340. These per-span capabilities may also be referred to as a BD limit and a CCE limit, respectively.

A UE may report a capability regarding one or more span configurations supported by the UE. For example, the UE may report that the UE supports one or more of span configurations (2, 2), (4, 3), and (7, 3). The UE may determine which span configuration is to be used for a communication based at least in part on a search space configuration. For example, a search space configuration may indicate search space candidates, and the UE may identify a span configuration that aligns with the search space candidates. In the case that the search space configuration aligns with two or more span configurations, the UE may use a largest CCE limit and/or a BD limit of the CCE limits and/or BD limits associated with the two or more span configurations. The BD limit may identify a number of PDCCH candidates that the UE is required to monitor.

The UE may use a maximum CCE/BD limit and a maximum total CCE/BD limit to perform distribution of BDs and CCEs, as described elsewhere herein. A maximum CCE/BD limit may identify a maximum number of blind decodes or non-overlapped CCEs per span and per carrier, and a maximum total CCE/BD limit may identify a maximum number of blind decodes or non-overlapped CCEs across spans on active downlink bandwidth part(s) of scheduling cells if the spans on the scheduling cells are aligned. Alignment is described in more detail in connection with FIG. 4. In some aspects, the maximum total CCE limit may be referred to herein as C_tot or $C_{PDCCH}^{total}$ and the maximum total BD limit may be referred to herein as M_tot or $M_{PDCCH}^{total}$ CCE limits and BD limits may be different for different parameters, such as different span configurations, numerologies, numbers of TRPs (e.g., single-TRP versus multi-TRP carriers), and so on. The notation used to describe a CCE limit or BD limit may indicate one or more parameters associated with the CCE. For example, a maximum total CCE limit for a given subcarrier spacing (SCS, denoted by μ) and a given span configuration may be denoted by $C_{PDCCH}^{total,(X,Y),\mu}$.

As indicated above, FIG. 3 is provided as an example. Other examples may differ from what is described with respect to FIG. 3.

Figure 4:
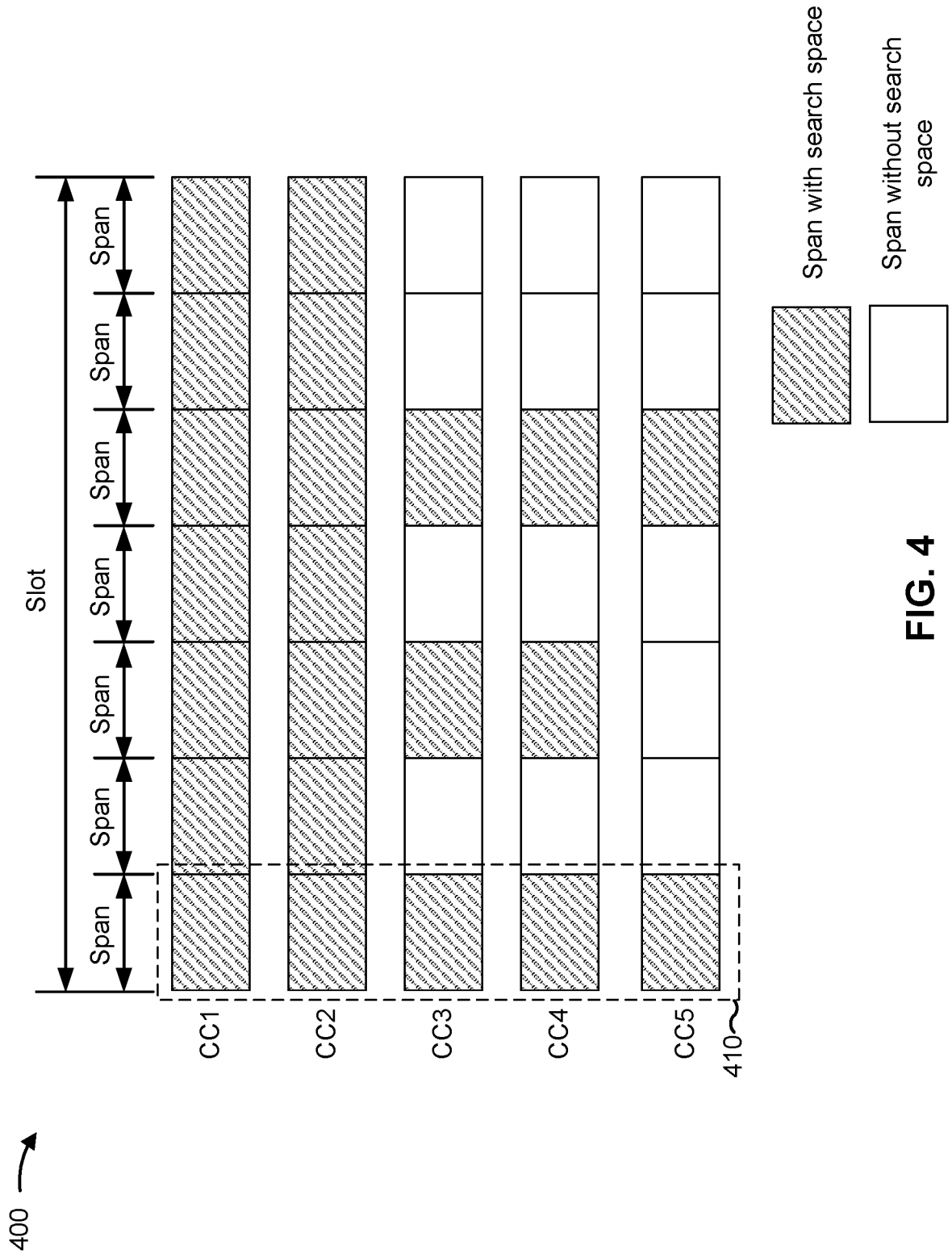
FIG. 4 is a diagram illustrating an example of alignment and non-alignment of spans based at least in part on whether search spaces are configured in the spans, in accordance with the present disclosure.

FIG. 4 is a diagram illustrating an example 400 of alignment and non-alignment of spans based at least in part on whether search spaces are configured in the spans, in accordance with the present disclosure. FIG. 4 shows spans on a plurality of component carriers (CCs). It should be noted that "CC" is generally used interchangeably with "cell" and "carrier" herein. A CC is one of multiple frequency blocks assigned to a user as part of a carrier aggregation (CA) configuration. CA enables increased data rate by way of configuration of multiple CCs. CCs can be intra-band (e.g., all included in a same frequency band) or inter-band (e.g., included in two or more different frequency bands) and can be non-contiguous or contiguous. The spans shown in FIG. 4 use a span configuration of (2, 2) in a slot with a 30 kHz SCS. Thus, in FIG. 4, the slot includes 14 symbols (not shown) and a span starts every two symbols. A diagonal fill indicates that a search space (SS) is configured on a span of a CC. A span in which an SS is configured may be referred to as a configured span. As shown, for CC1 and CC2, all spans are configured, whereas for CC3, CC4, and CC5, respective subsets of spans are configured.

Two or more CCs are said to be aligned when the two or more CCs have a same SCS and span configuration (e.g., (X, Y)), the two or more CCs share one or more sets of overlapping configured spans, and each set of overlapping configured spans of the two or more CCs starts from a respective same symbol. Reference number 410 shows a set of overlapping spans of CC1 through CC5 that start from the same symbol. However, in example 400, under one definition of alignment, CC1 through CC5 are not all aligned with each other, since not all configured spans of CC1 through CC5 overlap. For example, while all spans are configured on CC1 and CC2, not all spans are configured on CC3, CC4, and CC5. However, CC1 and CC2 are aligned with each other since CC1 and CC2 have a same SCS and span configuration and since all pairs of overlapped configured spans of CC1 and CC2 start from respective same symbols (e.g., symbols 0, 2, 4, 6, 8, 10, and 12, which are not explicitly shown). If every span on every carrier in example 400 were filled with the diagonal fill, then all five CCs would be aligned with each other. Furthermore, CC3 and CC4 are aligned with each other, but not with CC1, CC2, or CC5.

The maximum total BD and CCE limits of the UE may be respected across spans in each overlapped group of spans.

For example, for the group of configured spans shown by reference number 410, BDs and CCEs must be limited to both the maximum CCE/BD limit on a given carrier and the maximum total CCE/BD limit across CC1 through CC5 in the aggregate.

As indicated above, FIG. 4 is provided as an example. Other examples may differ from what is provided with regard to FIG. 4.

Figure 5:
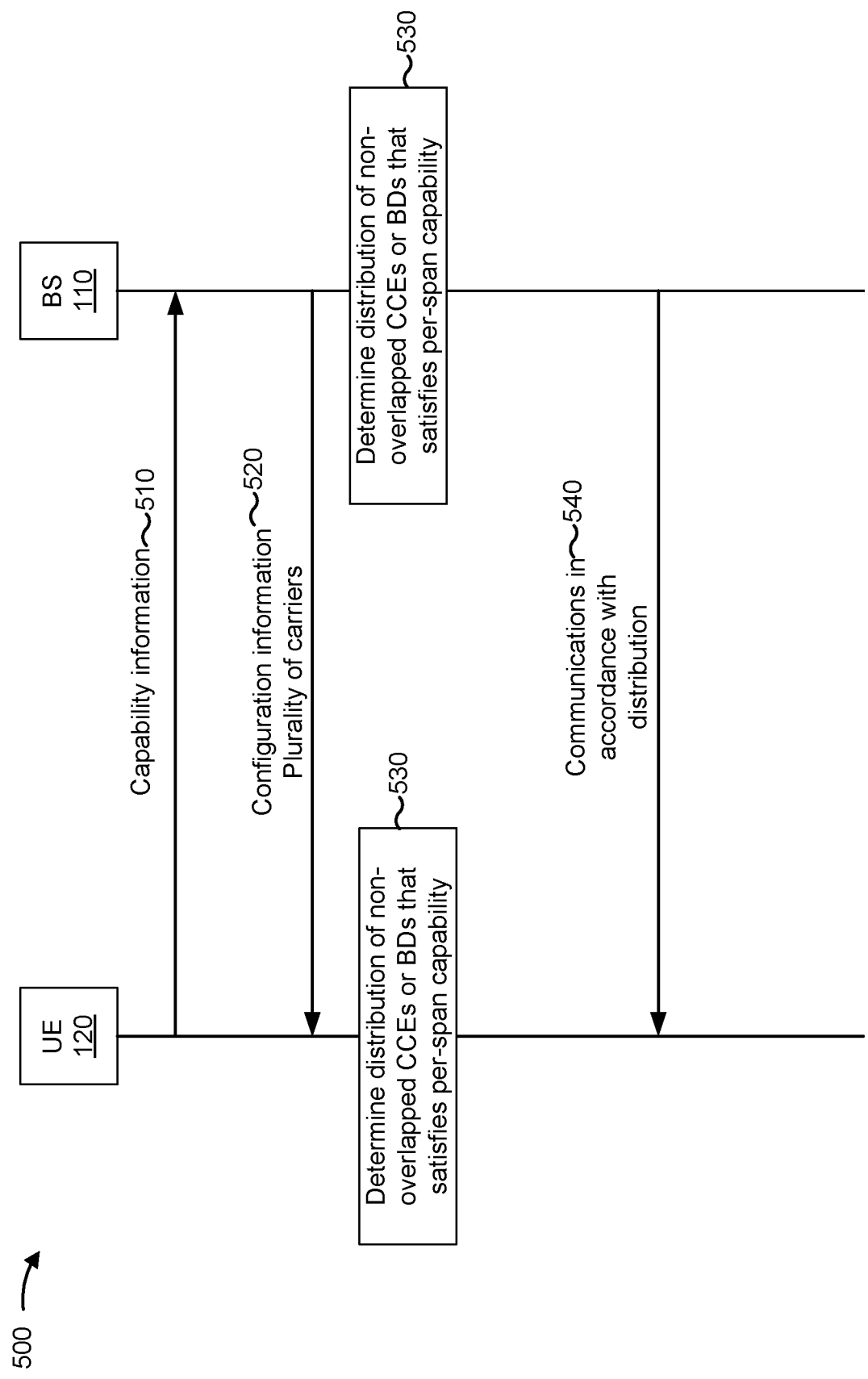
FIG. 5 is a diagram illustrating an example of determining a distribution for control channel elements (CCEs) and/or blind decodes (BDs) for a multi-transmit receive point (TRP) carrier, in accordance with the present disclosure.

FIG. 5 is a diagram illustrating an example 500 of determining a distribution for CCEs and/or BDs for a multi-TRP carrier, in accordance with the present disclosure. As shown, example 500 includes a UE 120 and a BS 110.

As shown by reference number 510, the UE 120 may signal capability information (e.g., UE Capability Information) to the BS 110. In some aspects, the capability information may include information relating to Release 16 PDCCH monitoring, such as a capability indicating whether the UE 120 can be configured with one or more carriers for Release 16 PDCCH monitoring, and/or the like. In some aspects, the capability information may identify a CCE limit and/or a BD limit for the UE 120. In some aspects, the capability information may identify a factor associated with multi-TRP communication, such as γ described elsewhere herein.

As shown by reference number 520, the UE 120 may be configured with a plurality of carriers. For example, the BS 110 may provide configuration information to the UE 120 for the plurality of carriers. In some aspects, the configuration information may indicate whether each carrier, of the plurality of carriers, is associated with a Release 15 (e.g., slot-based) PDCCH monitoring configuration or a Release 16 (e.g., span-based with CCE/BD limits defined per span) PDCCH monitoring configuration. In some aspects, the configuration information may indicate differentiation parameters (e.g., CORESET pool indexes, timing capability indicators, and/or the like) for CORESETs on the plurality of carriers. For example, the configuration information may map the plurality of carriers to spans based at least in part on span configurations associated with the plurality of carriers. The configuration information may be provided via radio resource control (RRC) signaling, medium access control (MAC) signaling, DCI, a combination thereof, or the like.

As shown by reference number 530, the BS 110 and/or the UE 120 may distribute the CCEs and BDs according to various rules described below based at least in part on whether carriers, of the plurality of carriers, are single-TRP carriers or multi-TRP carriers. In some aspects, the UE 120 may determine the distribution of CCEs and/or BDs and may receive communications on the plurality of carriers in accordance with the distribution. In some aspects, the UE 120 may receive communications on the plurality of carriers without having determined the distribution. For example, the BS 110 may ensure that the communications and the configuration of the plurality of carriers conform to the determined distribution. The determination of the distribution may be performed before or after the configuration of the plurality of carriers.

The below description is of the determination of a maximum CCE/BD limit for one or more single-TRP carriers and one or more multi-TRP carriers without taking into account whether a carrier is a Release 16 carrier (e.g., a carrier configured for a Release 16 PDCCH). After the description of the determination of a maximum CCE/BD limit for one or more single-TRP carriers and one or more multi-TRP carriers without taking into account whether a carrier is a Release 16 carrier, a description of determination of the maximum CCE/BD limit taking into account whether a carrier is a Release 16 carrier is provided. $N_{cells,0}^{DL,\mu}$ denotes a number of single-TRP cells associated with a given SCS, and $N_{cells,1}^{DL,\mu}$ denotes a number of multi-TRP cells associated with the given SCS. In other words, in the below description, the subscript 0 indicates a number, capability, or limit associated with a single-TRP cell, and the subscript 1 indicates a number, capability, or limit associated with a multi-TRP cell. CORESETPoolIndex is a differentiation parameter that indicates whether a CORESET is associated with a first group (e.g., a first TRP) or a second group (e.g., a second TRP). CORESETPoolIndex can differentiate between more than two groups of CORESETs, in some aspects. A single-TRP cell may be associated with CORESETs that are all associated with a same CORESETPoolIndex value, and a multi-TRP cell may be associated with CORESETs that are associated with two or more different CORESETPoolIndex values.

If a UE is configured with $N_{cells,0}^{DL,\mu}+N_{cells,1}^{DL,\mu}$ downlink cells with active DL BWPs using SCS configuration $\mu$ where $\Sigma_{\mu=0}^{3}(N_{cells,0}^{DL,\mu}+\gamma \cdot N_{cells,1}^{DL,\mu}) \leq N_{cells}^{cap}$, the UE is not required to monitor, on the active DL BWP of the scheduling cell, more than $M_{PDCCH}^{total,slot,\mu}=M_{PDCCH}^{max,slot,\mu}$ PDCCH candidates or more than $C_{PDCCH}^{total,slot,\mu}=C_{PDCCH}^{max,slot,\mu}$ non-overlapped CCEs per slot for each scheduled cell when the scheduling cell is from the $N_{cells,0}^{DL,\mu}$ downlink cells, or more than $M_{PDCCH}^{total,slot,\mu}=\gamma \cdot M_{PDCCH}^{max,slot,\mu}$ PDCCH candidates or more than $C_{PDCCH}^{total,slot,\mu}=\gamma \cdot C_{PDCCH}^{max,slot,\mu}$ non-overlapped CCEs per slot for each scheduled cell when the scheduling cell is from the $N_{cells,1}^{DL,\mu}$ downlink cells more than $M_{PDCCH}^{max,slot,\mu}$ PDCCH candidates or more than $C_{PDCCH}^{max,slot,\mu}$ non-overlapped CCEs per slot for CORESETs with same CORESETPoolIndex value for each scheduled cell when the scheduling cell is from the $N_{cells,1}^{DL,\mu}$ downlink cells If a UE is configured with $N_{cells,0}^{DL,\mu}+N_{cells,1}^{DL,\mu}$ downlink cells with active DL BWPs using SCS configuration $\mu$, where $\Sigma_{\mu=0}^{3}(N_{cells,0}^{DL,\mu}+\gamma \cdot N_{cells,1}^{DL,\mu}) > N_{cells}^{cap}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,slot,\mu}=\lfloor N_{cells}^{cap} \cdot M_{PDCCH}^{max,slot,\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$ PDCCH candidates or more than $C_{PDCCH}^{total,slot,\mu}=\lfloor N_{cells}^{cap} \cdot C_{PDCCH}^{max,slot,\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$ non-overlapped CCEs per slot on the active DL BWP(s) of scheduling cell(s) from the $N_{cells,0}^{DL}+N_{cells,1}^{DL}$ downlink cells.

For each scheduled cell, the UE is not required to monitor on the active DL BWP with SCS configuration $\mu$ of the scheduling cell from the $N_{cells,0}^{DL,\mu}$ downlink cells more than $\min(M_{PDCCH}^{max,slot,\mu},M_{PDCCH}^{total,slot,\mu})$ PDCCH candidates or more than $\min(C_{PDCCH}^{max,slot,\mu},C_{PDCCH}^{total,slot,\mu})$ non-overlapped CCEs per slot.

For each scheduled cell, the UE is not required to monitor on the active DL BWP with SCS configuration $\mu$ of the scheduling cell from the $N_{cells}^{DL,\mu}$ downlink cells more than $\min(\gamma \cdot M_{PDCCH}^{max,slot,\mu},M_{PDCCH}^{total,slot,\mu})$ PDCCH candidates or more than $\min(\gamma \cdot C_{PDCCH}^{max,slot,\mu},C_{PDCCH}^{total,slot,\mu})$ non-overlapped CCEs per slot more than $\min(M_{PDCCH}^{max,slot,\mu},M_{PDCCH}^{total,slot,\mu})$ PDCCH candidates or more than $\min(C_{PDCCH}^{max,slot,\mu},C_{PDCCH}^{total,slot,\mu})$ non-overlapped CCEs per slot for CORESETs with same CORESETPoolIndex value If, for the UE-specific search space (USS) sets for scheduling on the primary cell, the UE is not provided CORESETPoolIndex for first CORESETs, or is provided value 0 for first CORESETs, and is provided value 1 for second CORESETs, and if $\min(\gamma \cdot M_{PDCCH}^{max,slot,\mu},M_{PDCCH}^{total,slot,\mu}) > \min(M_{PDCCH}^{max,slot,\mu},M_{PDCCH}^{total,slot,\mu})$ or $\min(\gamma \cdot C_{PDCCH}^{max,slot,\mu},C_{PDCCH}^{total,slot,\mu}) > \min(C_{PDCCH}^{max,slot,\mu},C_{PDCCH}^{total,slot,\mu})$, one or more search spaces may be identified for dropping using a procedure that applies only to USS sets associated with the first CORESETs. A UE does not expect to monitor PDCCH in a USS set without allocated PDCCH candidates for monitoring.

The distribution of CCEs and BDs may involve hard splitting and soft splitting. "Hard splitting" refers to dividing a plurality of carriers into two or more groups of carriers based at least in part on one or more properties of the plurality of carriers. For example, if a set of carriers is hard-split based on SCS, then all carriers of the set of carriers associated with a first SCS may be placed in a first group, all carriers associated with a second SCS may be placed in a second group, and so on. A group of carriers, formed by hard-splitting a plurality of carriers, may be associated with a set of BDs or CCEs that are to be distributed among the group of carriers. "Soft splitting" may be performed within a group of carriers that is formed by hard splitting a plurality of carriers. For example, a set of CCEs or BDs, of a group of carriers, may be soft-split among the group of carriers based at least in part on one or more rules, described below.

In some aspects, the UE 120 may distribute the non-overlapped CCEs and/or BDs based at least in part on SCSs, span configurations, multi-TRP or single-TRP configurations, and whether a carrier is associated with a Release 16 PDCCH. As an example, the UE 120 may hard-split a plurality of carriers in accordance with SCSs, and in accordance with whether the plurality of carriers are associated with Release 16 PDCCHs, and in accordance with search space set alignments with span configurations of the plurality of carriers to form groups of carriers with the same SCS, Release 16 PDCCH configuration (or lack thereof), and span configuration alignment. Then, the UE 120 may perform soft splitting to distribute CCEs and BDs among a set of first carriers that are single-TRP carriers and a set of second carriers that are multi-TRP carriers.

In some aspects, the UE 120 may distribute the non-overlapped CCEs and/or BDs based at least in part on the rules described above for multi-TRP CCE/BD distribution while taking into account whether the plurality of carriers are associated with Release 16 PDCCH configurations. For example, the UE 120 may use the rules described above, and may replace $N_{cells,0}^{DL,\mu}$ and $N_{cells,r16,0}^{DL,(X,Y),\mu}$ and $N_{cells,1}^{DL,\mu}$ with $N_{cells,r16,1}^{DL,(X,Y),\mu}$. Thus, the UE 120 may perform hard splitting based at least in part on whether the cells are associated with a Release 16 PDCCH (as indicated by the r16 in the subscript of the variables) and for the set of first carriers (indicated by $N_{cells,r16,0}^{DL,(X,Y),\mu}$) and the set of second carriers (indicated by $N_{cells,r16,1}^{DL,(X,Y),\mu}$). Furthermore, the UE 120 may replace $N_{cells}^{cap}$ with $N_{cells}^{cap-r16}$ if all cells are configured with the Release 16 PDCCH, and with $N_{cells,r16}^{cap-r16}$ if the UE 120 configured with both Release 15 PDCCH carriers and Release 16 PDCCH carriers. In some aspects, the UE 120 may perform the distribution across one or more SCSs that are associated with the Release 16 PDCCH. For example, the UE 120 may perform the distribution for SCSs for which the Release 16 PDCCH is configured. As a more particular example, the UE 120 may perform the distribution for the 15 kHz and 30 kHz SCSs (e.g., SCS configurations 0 and 1). Thus, summations that include SCS configurations 0 through 3 may be replaced with summations that include SCS configurations 0 and 1. Furthermore, per-slot constraints (e.g., maximum and/or maximum total numbers of non-overlapped CCEs/BDs per slot) may be replaced with per-span constraints. Thus, the outputs of the equations, $M_{PDCCH}^{total,(X,Y),\mu}$ and $C_{PDCCH}^{total,(X,Y),\mu}$, define limits across spans of different carriers for CCEs and BDs in the aligned and non-aligned cases.

In some aspects, the UE 120 or the BS 110 may perform overbooking and/or dropping of PDCCHs for multi-TRP carriers. "Overbooking" refers to the practice of scheduling more PDCCHs than can be transmitted in a given set of resources, such as a given span. In some aspects, the UE 120 may perform span-based overbooking and dropping. In some aspects, span-based overbooking and/or dropping may be allowed only on a primary carrier, in a fixed single or a subset of spans where search space sets associated with a CORESET with index 0 are present. In some aspects, this limitation may be defined as a fixed subset of spans with common search spaces (CSS), except a Type 3 CSS, associated with CORESETs with a CORESETPoolIndex that is not configured or is set to zero. In some aspects, this limitation may be defined as a fixed subset of spans with CSSs associated with CORESETs with a CORESETPoolIndex that is not configured or is set to zero. In some aspects, this limitation may be defined as a fixed subset of spans with CSSs, including only a subset of Type 3 CSSs which are configured for monitoring a subset of (e.g., group common, Format 2-X) DCI formats, associated with CORESETs with a CORESETPoolIndex that is not configured or is set to zero. Thus, the UE 120 and/or the BS 110 may perform span-based overbooking and dropping, which improves resource utilization and conserves computing resources.

In some aspects, two or more TRPs may be associated with different span configurations. For example, two or more TRPs may serve different traffic types with different requirements, so using different span configurations may be beneficial for such TRPs. In this case, on a given serving cell, the search space/CORESET configuration of a first TRP may be based at least in part on a (2, 2) span configuration, and the search space/CORESET configuration of a second TRP may be based at least in part on a (7, 3) span configuration. For example, the search spaces and/or CORESETs of the first TRP may align with (2, 2) spans and the search spaces and/or CORESETs of the second TRP may align with (7, 3) spans. In some aspects, multiple active BWPs on a given CC may be allowed. For example, two or more BWPs may be associated with different search space configurations corresponding to different span configurations. It should be noted that support for different span configurations is not limited to the multi-TRP implementation, and can be used for any set of CORESETs associated with a differentiating parameter, as described below.

For a carrier associated with a Release 16 PDCCH configuration (e.g., a carrier configured with PDCCHMornitoringCapabilityConfig=R16 PDCCH monitoring capability), there may be at least three options for configuring the search spaces and CORESETs of the carrier:

Type 1: Two different differentiating parameters (e.g., pool indices and/or the like) are configured for a carrier, and a single set of spans is formed by the search spaces of the CORESETs with the same pool index.

Type 2: Two different differentiating parameters (e.g., pool indices and/or the like) are configured for a carrier, and a single set of spans is formed by the search spaces of the CORESETs with different pool indices.

Type 3: A single differentiating parameter (e.g., pool index and/or the like) is configured for a carrier, and a single set of spans is formed by the search spaces of the CORESETs.

Type 1 may correspond to a multi-TRP carrier with two different span configurations for respective TRPs. Type 2 may correspond to a multi-TRP carrier with a single span configuration for two or more TRPs. Type 3 may correspond to a single-TRP carrier. The UE 120 and/or the BS 110 may count the carrier a number of times based at least in part on whether the carrier is a Type 1 carrier, a Type 2 carrier, or a Type 3 carrier, and may perform CCE/BD distribution based at least in part on counting the carrier. For example, a carrier of Type 1 may be counted as a single-TRP carrier two times: once as part of $N_{cells,r16,0}^{DL,(X,Y),\mu}$ with a given SCS and a first span configuration (e.g., (X, Y)), and again as part of $N_{cells,r16,0}^{DL,(X',Y'),\mu}$ with a given SCS and a second span configuration (e.g., (X', Y')). A carrier of Type 2 may be counted as a multi-TRP carrier as part of $N_{cells,r16,1}^{DL,(X,Y),\mu}$. A carrier of Type 3 may be counted as a single-TRP carrier as part of $N_{cells,r16,0}^{DL,(X,Y),\mu}$.

In some aspects, the CORESETs described in connection with FIG. 5 may be differentiated using CORESET pool indexes (e.g., CORESETPoolIndex). However, in some aspects, any form of differentiation parameter may be used. For example, the differentiation parameter may be provided using RRC signaling associated with a CORESET or carrier. More particularly, if a carrier is configured with both minimum processing capabilities 1 and 2 and the timing capability indication is based on the index of the CORESET in which DCI is detected, then such a carrier can be considered as a Type 1 or Type 2 carrier. A carrier with a single processing timeline can then be considered as a Type 3 carrier.

In some aspects, the UE 120 and/or the BS 110 may differentiate between a Type 1 carrier and a Type 2 carrier. For example, in a case where two TRPs use a same span configuration, the UE 120 may differentiate the two TRPs based at least in part on a differentiation parameter. In a first case, if the search space/CORESET configuration for the two TRPs is such that all spans formed by each search space set separately are fully aligned (e.g., if the two TRPs are fully aligned with each other), then the carrier associated with the two TRPs may be considered a multi-TRP carrier (e.g., Type 2). If the spans are not fully aligned, then the carrier may be considered a single-TRP carrier (e.g., Type 1). In some aspects, a parameter (e.g., an RRC parameter and/or the like) may be used to differentiate between Type 1 carriers and Type 2 carriers. The counting of carriers based at least in part on the carriers' status as Type 1, 2, or 3 carriers may be referred to as a virtual carrier concept.

As an example, consider 3 Rel. 16 carriers:
CC0: SCS=30 KHz, (2,2) for TRP 1 and (7,3) for TRP 2
CC1: SCS=30 KHz and (2,2) with CORESETPoolIndex 0 only
CC2: SCS=30 KHz and (2,2) as a Type 1 carrier (with two CORESET pool indices.)

The UE 120 and/or the BS 110 may determine M_tot and C_tot for (2,2) carriers:
CC0 may be counted as a single TRP carrier once for (2,2) and once for (7,3)
CC1 may be counted as a single-TRP carrier
CC2 may be counted as a multi-TRP carrier Hence, for the set of carriers configured with Rel. 16 PDCCH, SCS=30 KHz and (2,2) pattern, N_DL,0=2 and N_DL,1=1.

In some aspects, the UE 120 may perform the distribution of the BDs and/or CCEs based at least in part on a factor (e.g., γ) used to scale a single-TRP capability for multi-TRP carrier. For example, the UE 120 or the BS 110 may multiply a per-span capability for a single-TRP carrier by the factor to determine the per-span capability for a multi-TRP carrier. The factor may be based at least in part on a capability of the UE. For example, the UE 120 may report the factor to the BS 110, or the BS 110 may determine the factor based at least in part on a capability (e.g., a multi-TRP capability and/or the like) of the UE 120.

In some aspects, the factor, and/or the per-span capability, may be allocated between two or more carriers based at least in part on configurations of the two or more carriers. For example, for each (X,Y) pattern (e.g., span configuration), the UE 120 may determine CCE/BD limits per slot as (per-span limit*max number of spans per slot). For example, the max number of spans per slot for (2,2) is 7, for (4,3) is 3, for (7,3) is 2 and for (3,2) is 4. Now, for a given factor reported by the UE 120, the BS 110 or the UE 120 may scale up the CCE/BD limits per slot for each (X,Y) by a factor of Z*factor, and then split the outcome across the spans of (X,Y). For example, consider 1 CC with (2,2) and (7,3) and Z=0.5. The sum CCE limit per slot for both cases is 112, and, for this example, the factor is 1.5. The sum, per slot, for (2,2) is 112*1.5/2=84, leading to a per-span limit of 84/7. The sum, per slot, for (7,3) is 84, leading to a per-span limit of 84/2. In some aspects, if the slot level limits are equal for different (X,Y) patterns on a given carrier, then setting Z=0.5 may be appropriate.

In a more general case, two different scalars can be assumed to scale the limits proportionately to the slot limits. For example, consider 1 CC with (7,3) and (2,2) span configurations. For this example, the per-span CCE limit for (7,3) is 56 and for (2,2) is 8. The factor (e.g., gamma) reported by the UE 120 for this example is 1.5. In this case, the per-slot limit for (7,3) is 112. The proportional limit per slot for (7,3) is equal to 1.5*112*112/(112+56)=112. The per span limit is then 56. Similarly, the slot limit for (2,2)=56. The proportional limit per slot for (2,2)=1.5*56*56/(112+56)=28. The per-span limit is then equal to 8. Note that this approach allocates the factor (e.g., 1.5 in this case) proportionally across different (X,Y) patterns.

As shown by reference number 540, the UE 120 may receive communications on the plurality of carriers in accordance with the distribution. For example, the UE 120 may receive single-TRP and/or multi-TRP communications on the plurality of carriers. The single-TRP and/or multi-TRP communications may satisfy the per-span limitations of the UE 120. Thus, efficiency of allocation of CCEs and/or BDs is improved, thereby improving utilization of multi-TRP and single-TRP carrier resources.

As indicated above, FIG. 5 is provided as an example. Other examples may differ from what is provided with regard to FIG. 5.

It should be noted that any reference to a single-TRP carrier can refer more generally to a carrier associated with CORESETs of a single differentiation parameter, and any reference to a multi-TRP carrier can refer more generally to a carrier associated with CORESETs of two or more different differentiation parameters.

Figure 6:
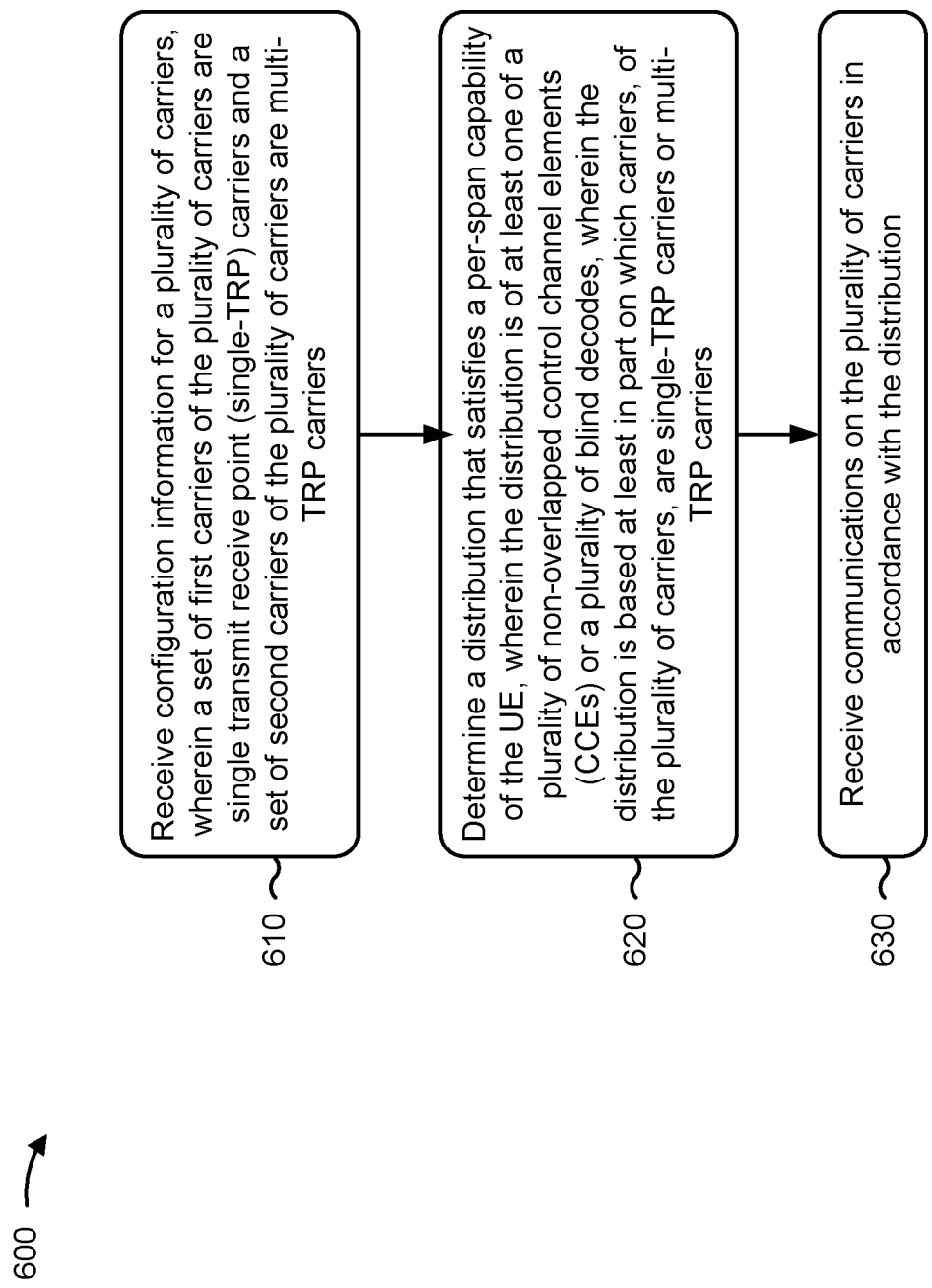
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with a span-based control channel for multiple TRPs.

As shown in FIG. 6, in some aspects, process 600 may include receiving configuration information for a plurality of carriers, wherein a set of first carriers of the plurality of carriers are single-TRP carriers and a set of second carriers of the plurality of carriers are multi-TRP carriers (block 610). For example, the UE (e.g., using antenna 252, DEMOD 254, MIMO detector 256, receive processor 258, controller/processor 280, and/or the like) may receive configuration information for a plurality of carriers, as described above. In some aspects, a set of first carriers of the plurality of carriers are single-TRP carriers and a set of second carriers of the plurality of carriers are multi-TRP carriers.

As further shown in FIG. 6, in some aspects, process 600 may include determining, for the plurality of carriers, a distribution that satisfies a per-span capability of the UE, wherein the distribution is of at least one of a plurality of non-overlapped CCEs or a plurality of blind decodes, and wherein the distribution is based at least in part on which carriers, of the plurality of carriers, are single-TRP carriers or multi-TRP carriers (block 620). For example, the UE (e.g., using antenna 252, DEMOD 254, MIMO detector 256, receive processor 258, controller/processor 280, and/or the like) may determine, for the plurality of carriers, a distribution that satisfies a per-span capability of the UE, as described above. In some aspects, the distribution is of at least one of a plurality of non-overlapped CCEs or a plurality of blind decodes. In some aspects, the distribution is based at least in part on which carriers, of the plurality of carriers, are single-TRP carriers or multi-TRP carriers.

As further shown in FIG. 6, in some aspects, process 600 may include receiving communications on the plurality of carriers in accordance with the distribution (block 630). For example, the UE (e.g., using antenna 252, DEMOD 254, MIMO detector 256, receive processor 258, controller/processor 280, and/or the like) may receive communications on the plurality of carriers in accordance with the distribution, as described above.

Process 600 may include additional aspects, such as any single aspect or any combination of aspects described below and/or in connection with one or more other processes described elsewhere herein.

In a first aspect, a number of carriers, of the plurality of carriers, exceeds a threshold associated with a monitoring capability of the UE, the monitoring capability is for span-based monitoring of the plurality of carriers, and determining the distribution is based at least in part on the number of carriers exceeding the threshold.

In a second aspect, alone or in combination with the first aspect, the monitoring capability relates to monitoring ultra-reliable low latency communication control information.

In a third aspect, alone or in combination with one or more of the first and second aspects, the distribution is based at least in part on a rule indicating that, for a given span associated with a given subcarrier spacing, a given physical downlink control channel configuration, and an alignment of search space sets with a given span configuration, across the set of first carriers, the UE is not to receive a number of non-overlapped CCEs or perform a number of blind decodes that exceeds a minimum of: a maximum number of blind decodes or non-overlapped CCEs indicated by the per-span capability for the given span, and a maximum total number of blind decodes or non-overlapped CCEs across respective spans of the plurality of carriers.

In a fourth aspect, alone or in combination with one or more of the first through third aspects, the rule is used to determine the distribution based at least in part on a number of the plurality of carriers exceeding a carrier capability of the UE.

In a fifth aspect, alone or in combination with one or more of the first through fourth aspects, the distribution is based at least in part on a rule indicating that, for a given span associated with a given subcarrier spacing, a given physical downlink control channel configuration, and an alignment of search space sets with a given span configuration, across the set of second carriers, the UE is not to receive a number of non-overlapped CCEs or perform a number of blind decodes that exceeds a minimum of: a maximum number of blind decodes or non-overlapped CCEs indicated by the per-span capability for the given span, scaled by a factor, and a maximum total number of blind decodes or non-overlapped CCEs across respective spans of the plurality of carriers, scaled by the factor.

In a sixth aspect, alone or in combination with one or more of the first through fifth aspects, the rule is used to determine the distribution based at least in part on a number of the plurality of carriers exceeding a carrier capability of the UE.

In a seventh aspect, alone or in combination with one or more of the first through sixth aspects, the factor is based at least in part on a capability of the UE associated with communicating using a plurality of control resource set pool indexes.

In an eighth aspect, alone or in combination with one or more of the first through seventh aspects, the respective spans comprise a combination of a first span on a first carrier, of the plurality of carriers, and a second span on a second carrier of the plurality of carriers.

In a ninth aspect, alone or in combination with one or more of the first through eighth aspects, the respective spans comprise a first span on a first carrier, of the plurality of carriers, and a second span on a second carrier, of the plurality of carriers, where the second span at least partially overlaps the first span.

In a tenth aspect, alone or in combination with one or more of the first through ninth aspects, the second span starts with a same symbol as the first span.

In an eleventh aspect, alone or in combination with one or more of the first through tenth aspects, process 600 includes determining the maximum total number of blind decodes or non-overlapped CCEs across respective spans of the plurality of carriers based at least in part on the maximum number of blind decodes or non-overlapped CCEs across respective spans of the plurality of carriers.

In a twelfth aspect, alone or in combination with one or more of the first through eleventh aspects, the single-TRP carriers are associated with respective single control resource set pool indexes, and the multi-TRP carriers are each associated with respective pluralities of control resource set pool indexes.

In a thirteenth aspect, alone or in combination with one or more of the first through twelfth aspects, the distribution is determined with regard to a set of subcarrier spacings usable for an ultra-reliable low latency communication traffic type.

In a fourteenth aspect, alone or in combination with one or more of the first through thirteenth aspects, the determination is based at least in part on one or more spans for which overbooking or dropping is permitted.

In a fifteenth aspect, alone or in combination with one or more of the first through fourteenth aspects, the one or more spans are associated with a primary carrier of the plurality of carriers, the one or more spans are associated with a CORE-SET with an index of zero, and the one or more spans are associated with a CORESET pool index that is not configured or that is zero.

In a sixteenth aspect, alone or in combination with one or more of the first through fifteenth aspects, the one or more spans are fixed.

In a seventeenth aspect, alone or in combination with one or more of the first through sixteenth aspects, the distribution is determined based at least in part on counting a number of carriers of the plurality of carriers, a second carrier, of the set of second carriers, is associated with search space sets, of two or more different differentiation parameters, that align with at least two different span configurations, and for determining the number of carriers, the second carrier is counted as at least two single-TRP carriers in accordance with a number of the at least two different span configurations.

In an eighteenth aspect, alone or in combination with one or more of the first through seventeenth aspects, the at least two single-TRP carriers are counted based at least in part on corresponding span configurations of the at least two different span configurations.

In a nineteenth aspect, alone or in combination with one or more of the first through eighteenth aspects, the distribution is determined based at least in part on counting a number of carriers of the plurality of carriers, a second carrier, of the set of second carriers, is associated with search space sets, of two or more different differentiation parameters, that align with a single span configuration, and for determining the number of carriers, the second carrier is counted as one multi-TRP carrier based at least in part on the second carrier being aligned with the single span configuration.

In a twentieth aspect, alone or in combination with one or more of the first through nineteenth aspects, the distribution is determined based at least in part on counting a number of carriers of the plurality of carriers, a first carrier, of the set of first carriers, is associated with search space sets, of a single differentiation parameter, that align with a single span configuration, and for determining the number of carriers, the first carrier is counted as one single-TRP carrier based at least in part on the first carrier being aligned with the single span configuration.

In a twenty-first aspect, alone or in combination with one or more of the first through twentieth aspects, the set of first carriers are associated with respective single differentiation parameters and the set of second carriers are associated with respective groups of two or more differentiation parameters.

In a twenty-second aspect, alone or in combination with one or more of the first through twenty-first aspects, the respective single differentiation parameters and the groups of two or more differentiation parameters comprise control resource set pool indexes.

In a twenty-third aspect, alone or in combination with one or more of the first through twenty-second aspects, the respective single differentiation parameters and the groups of two or more differentiation parameters comprise respective timing capability indications of the set of first carriers and the set of second carriers.

In a twenty-fourth aspect, alone or in combination with one or more of the first through twenty-third aspects, the determination of the distribution is based at least in part on scaling the per-span capability by a factor relating to a multi-TRP capability of the UE to generate a scaled per-span capability, and the distribution is based at least in part on allocating the scaled per-span capability to the plurality of carriers.

In a twenty-fifth aspect, alone or in combination with one or more of the first through twenty-fourth aspects, the distribution is determined based at least in part on counting a number of carriers of the plurality of carriers, and for determining the number of carriers, a second carrier, of the plurality of carriers, is selectively counted as a multi-TRP carrier or multiple single-TRP carriers, based at least in part on whether search space configurations of TRPs associated with the second carrier are aligned with a single span configuration.

In a twenty-sixth aspect, alone or in combination with one or more of the first through twenty-fifth aspects, the distribution is determined based at least in part on counting a number of carriers of the plurality of carriers, and for determining the number of carriers, a second carrier, of the plurality of carriers, is selectively counted as a multi-TRP carrier or multiple single-TRP carriers, based at least in part on an indication of how to count the second carrier.

In a twenty-seventh aspect, alone or in combination with one or more of the first through twenty-sixth aspects, the distribution is determined based at least in part on counting a number of carriers of the plurality of carriers, and for determining the number of carriers, a second carrier, of the plurality of carriers, is selectively counted as a multi-TRP carrier or multiple single-TRP carriers, based at least in part on one or more differentiation parameters associated with the second carrier.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
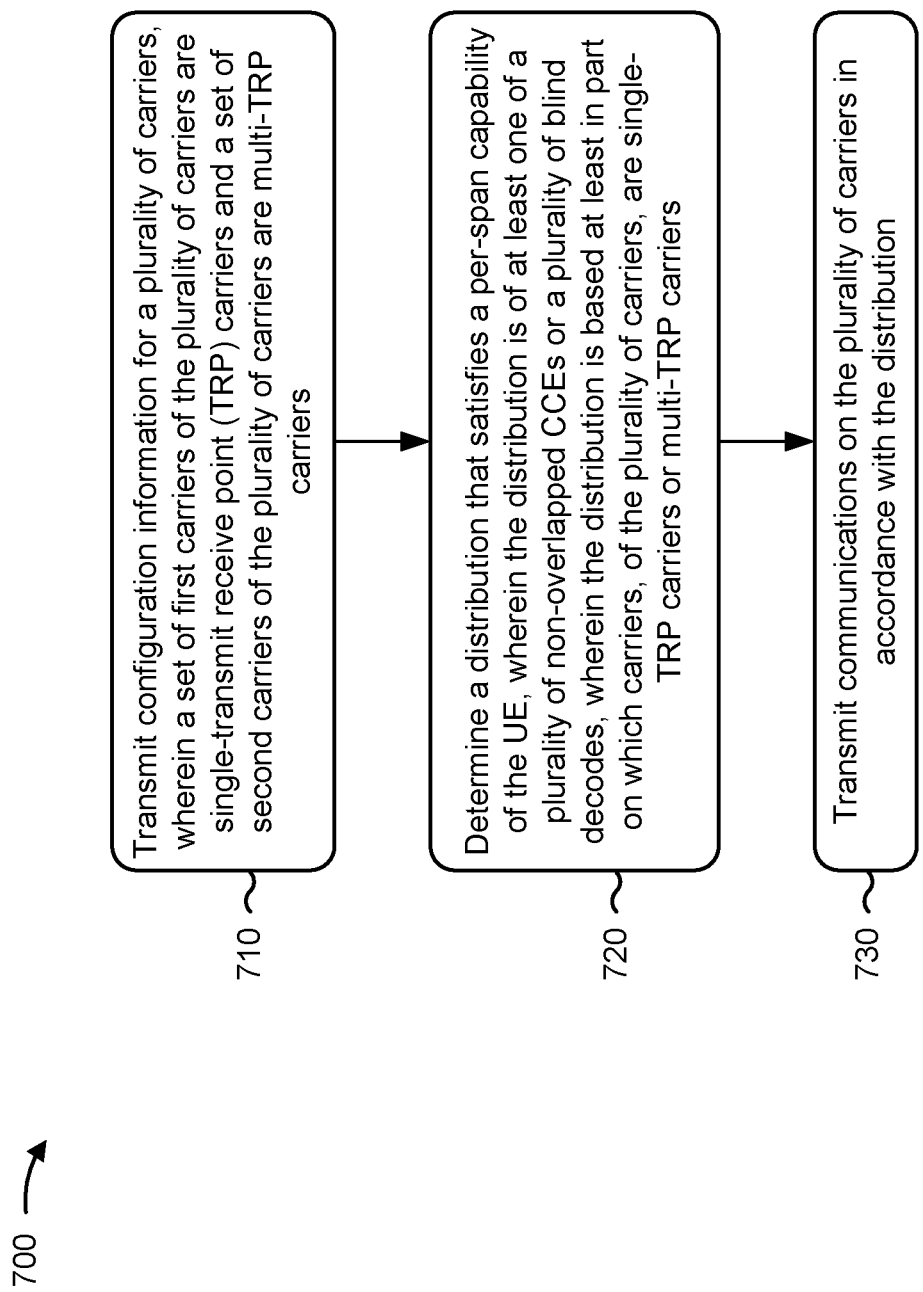
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110 and/or the like) performs operations associated with a span-based control channel for multiple TRPs.

As shown in FIG. 7, in some aspects, process 700 may include transmitting, to a UE, configuration information for a plurality of carriers, wherein a set of first carriers of the plurality of carriers are single-TRP carriers and a set of second carriers of the plurality of carriers are multi-TRP carriers (block 710). For example, the base station (e.g., using controller/processor 240, transmit processor 220, TX MIMO processor 230, MOD 232, antenna 234, and/or the like) may transmit, to a UE, configuration information for a plurality of carriers, as described above. In some aspects, a set of first carriers of the plurality of carriers are single-TRP carriers and a set of second carriers of the plurality of carriers are multi-TRP carriers.

As further shown in FIG. 7, in some aspects, process 700 may include determining, for the plurality of carriers, a distribution that satisfies a per-span capability of the UE, wherein the distribution is of at least one of a plurality of non-overlapped CCEs or a plurality of blind decodes, wherein the distribution is based at least in part on which carriers, of the plurality of carriers, are single-TRP carriers or multi-TRP carriers (block 720). For example, the base station (e.g., using controller/processor 240 and/or the like) may determine, for the plurality of carriers, a distribution that satisfies a per-span capability of the UE, as described above. In some aspects, the distribution is of at least one of a plurality of non-overlapped CCEs or a plurality of blind decodes. In some aspects, the distribution is based at least in part on which carriers, of the plurality of carriers, are single-TRP carriers or multi-TRP carriers.

As further shown in FIG. 7, in some aspects, process 700 may include transmitting communications on the plurality of carriers in accordance with the distribution (block 730). For example, the base station (e.g., using controller/processor 240, transmit processor 220, TX MIMO processor 230, MOD 232, antenna 234, and/or the like) may transmit communications on the plurality of carriers in accordance with the distribution, as described above.

Process 700 may include additional aspects, such as any single aspect or any combination of aspects described below and/or in connection with one or more other processes described elsewhere herein.

In a first aspect, a number of carriers, of the plurality of carriers, exceeds a threshold associated with a monitoring capability of the UE, the monitoring capability is for span-based monitoring of the plurality of carriers, and determining the distribution is based at least in part on the number of carriers exceeding the threshold.

In a second aspect, alone or in combination with the first aspect, the monitoring capability relates to monitoring ultra-reliable low latency communication control information.

In a third aspect, alone or in combination with one or more of the first and second aspects, the distribution is based at least in part on a rule indicating that, for a given span associated with a given subcarrier spacing, a given PDCCH configuration, and an alignment of search space sets with a given span configuration, across the set of first carriers, the UE is not to receive a number of non-overlapped CCEs or perform a number of blind decodes that exceeds a minimum of: a maximum number of blind decodes or non-overlapped CCEs indicated by the per-span capability for the given span, and a maximum total number of blind decodes or non-overlapped CCEs across respective spans of the plurality of carriers.

In a fourth aspect, alone or in combination with one or more of the first through third aspects, the rule is used to determine the distribution based at least in part on a number of the plurality of carriers exceeding a carrier capability of the UE.

In a fifth aspect, alone or in combination with one or more of the first through fourth aspects, the distribution is based at least in part on a rule indicating that, for a given span associated with a given subcarrier spacing, a given PDCCH configuration, and an alignment of search space sets with a given span configuration, across the set of second carriers, the UE is not to receive a number of non-overlapped CCEs or perform a number of blind decodes that exceeds a minimum of: a maximum number of blind decodes or non-overlapped CCEs indicated by the per-span capability for the given span, scaled by a factor, and a maximum total number of blind decodes or non-overlapped CCEs across respective spans of the plurality of carriers, scaled by the factor.

In a sixth aspect, alone or in combination with one or more of the first through fifth aspects, the rule is used to determine the distribution based at least in part on a number of the plurality of carriers exceeding a carrier capability of the UE.

In a seventh aspect, alone or in combination with one or more of the first through sixth aspects, the factor is based at least in part on a multi-TRP capability of the UE.

In an eighth aspect, alone or in combination with one or more of the first through seventh aspects, the respective spans comprise a combination of a first span on a first carrier, of the plurality of carriers, and a second span on a second carrier of the plurality of carriers.

In a ninth aspect, alone or in combination with one or more of the first through eighth aspects, the respective spans comprise a first span on a first carrier, of the plurality of carriers, and a second span on a second carrier, of the plurality of carriers, the second span at least partially overlaps the first span.

In a tenth aspect, alone or in combination with one or more of the first through ninth aspects, the second span starts with a same symbol as the first span.

In an eleventh aspect, alone or in combination with one or more of the first through tenth aspects, process 700 includes determining the maximum total number of blind decodes or non-overlapped CCEs across respective spans of the plurality of carriers based at least in part on the maximum number of blind decodes or non-overlapped CCEs across respective spans of the plurality of carriers.

In a twelfth aspect, alone or in combination with one or more of the first through eleventh aspects, the set of first carriers are associated with respective single control resource set pool indexes, and the set of second carriers are each associated with respective pluralities of control resource set pool indexes.

In a thirteenth aspect, alone or in combination with one or more of the first through twelfth aspects, the distribution is determined with regard to a set of subcarrier spacings usable for an ultra-reliable low latency communication traffic type.

In a fourteenth aspect, alone or in combination with one or more of the first through thirteenth aspects, the determination is based at least in part on one or more spans for which overbooking or dropping is permitted.

In a fifteenth aspect, alone or in combination with one or more of the first through fourteenth aspects, the one or more spans are associated with a primary carrier of the plurality of carriers, the one or more spans are associated with a CORESET with an index of zero, and the one or more spans are associated with a CORESET pool index that is not configured or that is zero.

In a sixteenth aspect, alone or in combination with one or more of the first through fifteenth aspects, the one or more spans are fixed.

In a seventeenth aspect, alone or in combination with one or more of the first through sixteenth aspects, the distribution is determined based at least in part on counting a number of carriers of the plurality of carriers, a second carrier, of the set of second carriers, is associated with search space sets, of two or more different differentiation parameters, that align with at least two different span configurations, and for determining the number of carriers, the second carrier is counted as at least two single-TRP carriers in accordance with a number of the at least two different span configurations.

In an eighteenth aspect, alone or in combination with one or more of the first through seventeenth aspects, the at least two single-TRP carriers are counted based at least in part on corresponding span configurations of the at least two different span configurations.

In a nineteenth aspect, alone or in combination with one or more of the first through eighteenth aspects, the distribution is determined based at least in part on counting a number of carriers of the plurality of carriers, a second carrier, of the set of second carriers, is associated with search space sets, of two or more different differentiation parameters, that align with a single span configuration, and for determining the number of carriers, the second carrier is counted as one multi-TRP carrier based at least in part on the second carrier being aligned with the single span configuration.

In a twentieth aspect, alone or in combination with one or more of the first through nineteenth aspects, the distribution is determined based at least in part on counting a number of carriers of the plurality of carriers, a first carrier, of the set of first carriers, is associated with search space sets, of a single differentiation parameter, that align with a single span configuration, and for determining the number of carriers, the first carrier is counted as one single-TRP carrier based at least in part on the first carrier being aligned with the single span configuration.

In a twenty-first aspect, alone or in combination with one or more of the first through twentieth aspects, the set of first carriers are associated with respective single differentiation parameters and the set of second carriers are associated with respective groups of two or more differentiation parameters.

In a twenty-second aspect, alone or in combination with one or more of the first through twenty-first aspects, the respective single differentiation parameters and the groups of two or more differentiation parameters comprise control resource set pool indexes.

In a twenty-third aspect, alone or in combination with one or more of the first through twenty-second aspects, the respective single differentiation parameters and the groups of two or more differentiation parameters comprise respective timing capability indications of the set of first carriers and the set of second carriers.

In a twenty-fourth aspect, alone or in combination with one or more of the first through twenty-third aspects, the determination of the distribution is based at least in part on scaling the per-span capability by a factor relating to a multi-TRP capability of the UE to generate a scaled per-span capability, and the distribution is based at least in part on allocating the scaled per-span capability to the plurality of carriers.

In a twenty-fifth aspect, alone or in combination with one or more of the first through twenty-fourth aspects, the distribution is determined based at least in part on counting a number of carriers of the plurality of carriers, and for determining the number of carriers, a second carrier, of the plurality of carriers, is selectively counted as a multi-TRP carrier or multiple single-TRP carriers, based at least in part on whether search space configurations of TRPs associated with the second carrier are aligned with a single span configuration.

In a twenty-sixth aspect, alone or in combination with one or more of the first through twenty-fifth aspects, the distribution is determined based at least in part on counting a number of carriers of the plurality of carriers, and for determining the number of carriers, a second carrier, of the plurality of carriers, is selectively counted as a multi-TRP carrier or multiple single-TRP carriers, based at least in part on an indication of how to count the second carrier.

In a twenty-seventh aspect, alone or in combination with one or more of the first through twenty-sixth aspects, the distribution is determined based at least in part on counting a number of carriers of the plurality of carriers, and for determining the number of carriers, a second carrier, of the plurality of carriers, is selectively counted as a multi-TRP carrier or multiple single-TRP carriers, based at least in part on one or more differentiation parameters associated with the second carrier.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: receiving configuration information for a plurality of carriers, wherein a set of first carriers of the plurality of carriers are single transmit receive point (single-TRP) carriers and a set of second carriers of the plurality of carriers are multi-TRP carriers; determining, for the plurality of carriers, a distribution that satisfies a per-span capability of the UE, wherein the distribution is of at least one of a plurality of non-overlapped control channel elements (CCEs) or a plurality of blind decodes, wherein the distribution is based at least in part on which carriers, of the plurality of carriers, are single-TRP carriers or multi-TRP carriers; and receiving communications on the plurality of carriers in accordance with the distribution.

Aspect 2: The method of Aspect 1, wherein the single-TRP carriers are associated with respective single control resource set pool indexes and the multi-TRP carriers are each associated with respective pluralities of control resource set pool indexes.

Aspect 3: The method of Aspect 1, wherein a number of carriers, of the plurality of carriers, exceeds a threshold associated with a monitoring capability of the UE, wherein the monitoring capability is for span-based monitoring of the plurality of carriers, and wherein determining the distribution is based at least in part on the number of carriers exceeding the threshold.

Aspect 4: The method of Aspect 1, wherein the distribution is based at least in part on a rule indicating that, for a given span associated with a given subcarrier spacing, a given physical downlink control channel configuration, and an alignment of search space sets with a given span configuration, across the set of first carriers, the UE is not to receive a number of non-overlapped CCEs or perform a number of blind decodes that exceeds a minimum of: a maximum number of blind decodes or non-overlapped CCEs indicated by the per-span capability for the given span, and a maximum total number of blind decodes or non-overlapped CCEs across respective spans of the plurality of carriers.

Aspect 5: The method of Aspect 4, wherein the rule is used to determine the distribution based at least in part on a number of the plurality of carriers exceeding a carrier capability of the UE.

Aspect 6: The method of Aspect 1, wherein the distribution is based at least in part on a rule indicating that, for a given span associated with a given subcarrier spacing, a given physical downlink control channel configuration, and an alignment of search space sets with a given span configuration, across the set of second carriers, the UE is not to receive a number of non-overlapped CCEs or perform a number of blind decodes that exceeds a minimum of: a maximum number of blind decodes or non-overlapped CCEs indicated by the per-span capability for the given span, scaled by a factor, and a maximum total number of blind decodes or non-overlapped CCEs across respective spans of the plurality of carriers, scaled by the factor.

Aspect 7: The method of Aspect 6, wherein the rule is used to determine the distribution based at least in part on a number of the plurality of carriers exceeding a carrier capability of the UE.

Aspect 8: The method of Aspect 6, wherein the factor is based at least in part on a capability of the UE associated with communicating using a plurality of control resource set pool indexes.

Aspect 9: The method of Aspect 6, wherein the respective spans comprise a combination of a first span on a first carrier, of the plurality of carriers, and a second span on a second carrier of the plurality of carriers.

Aspect 10: The method of Aspect 6, wherein the respective spans comprise a first span on a first carrier, of the plurality of carriers, and a second span on a second carrier, of the plurality of carriers, wherein the second span at least partially overlaps the first span.

Aspect 11: The method of Aspect 10, wherein the second span starts with a same symbol as the first span.

Aspect 12: The method of Aspect 6, further comprising determining the maximum total number of blind decodes or non-overlapped CCEs across respective spans of the plurality of carriers based at least in part on the maximum number of blind decodes or non-overlapped CCEs across respective spans of the plurality of carriers.

Aspect 13: The method of Aspect 1, wherein the determination is based at least in part on one or more spans for which overbooking or dropping is permitted.

Aspect 14: The method of Aspect 13, wherein the one or more spans are associated with a primary carrier of the plurality of carriers, wherein the one or more spans are associated with a control resource set (CORESET) with an index of zero, and wherein the one or more spans are associated with a CORESET pool index that is not configured or that is zero.

Aspect 15: The method of Aspect 1, wherein the one or more spans are fixed.

Aspect 16: The method of Aspect 1, wherein the distribution is determined based at least in part on counting a number of carriers of the plurality of carriers, wherein a second carrier, of the set of second carriers, is associated with search space sets, of two or more different differentiation parameters, that align with at least two different span configurations, and wherein, for determining the number of carriers, the second carrier is counted as at least two single-TRP carriers in accordance with a number of the at least two different span configurations.

Aspect 17: The method of Aspect 16, wherein the at least two single-TRP carriers are counted based at least in part on corresponding span configurations of the at least two different span configurations.

Aspect 18: The method of Aspect 1, wherein the distribution is determined based at least in part on counting a number of carriers of the plurality of carriers, wherein a second carrier, of the set of second carriers, is associated with search space sets, of two or more different differentiation parameters, that align with a single span configuration, and wherein, for determining the number of carriers, the second carrier is counted as one multi-TRP carrier based at least in part on the second carrier being aligned with the single span configuration.

Aspect 19: The method of Aspect 1, wherein the distribution is determined based at least in part on counting a number of carriers of the plurality of carriers, wherein a first carrier, of the set of first carriers, is associated with search space sets, of a single differentiation parameter, that align with a single span configuration, and wherein, for determining the number of carriers, the first carrier is counted as one single-TRP carrier based at least in part on the first carrier being aligned with the single span configuration.

Aspect 20: The method of Aspect 1, wherein the set of first carriers are associated with respective single differentiation parameters and the set of second carriers are associated with respective groups of two or more differentiation parameters.

Aspect 21: The method of Aspect 20, wherein the respective single differentiation parameters and the groups of two or more differentiation parameters comprise control resource set pool indexes.

Aspect 22: The method of Aspect 20, wherein the respective single differentiation parameters and the groups of two or more differentiation parameters comprise respective timing capability indications of the set of first carriers and the set of second carriers.

Aspect 23: The method of Aspect 1, wherein the determination of the distribution is based at least in part on scaling the per-span capability by a factor relating to a multi-TRP capability of the UE to generate a scaled per-span capability, and wherein the distribution is based at least in part on allocating the scaled per-span capability to the plurality of carriers.

Aspect 24: The method of Aspect 1, wherein the distribution is determined based at least in part on counting a number of carriers of the plurality of carriers, and wherein, for determining the number of carriers, a second carrier, of the plurality of carriers, is selectively counted as a multi-TRP carrier or multiple single-TRP carriers.

Aspect 25: A method of wireless communication performed by a base station, comprising: transmitting, to a user equipment (UE), configuration information for a plurality of carriers, wherein a set of first carriers of the plurality of carriers are single-transmit receive point (TRP) carriers and a set of second carriers of the plurality of carriers are multi-TRP carriers; determining, for the plurality of carriers, a distribution that satisfies a per-span capability of the UE, wherein the distribution is of at least one of a plurality of non-overlapped control channel elements (CCEs) or a plurality of blind decodes, wherein the distribution is based at least in part on which carriers, of the plurality of carriers, are single-TRP carriers or multi-TRP carriers; and transmitting communications on the plurality of carriers in accordance with the distribution.

Aspect 26: The method of Aspect 25, wherein the single-TRP carriers are associated with respective single control resource set pool indexes and the multi-TRP carriers are each associated with respective pluralities of control resource set pool indexes.

Aspect 27: An apparatus for wireless communication at a device, comprising a processor; memory coupled with the processor; and instructions stored in the memory and executable by the processor to cause the apparatus to perform the method of one or more Aspects of Aspects 1-26.

Aspect 28: A device for wireless communication, comprising a memory and one or more processors coupled to the memory, the memory and the one or more processors configured to perform the method of one or more Aspects of Aspects 1-26.

Aspect 29: An apparatus for wireless communication, comprising at least one means for performing the method of one or more Aspects of Aspects 1-26.

Aspect 30: A non-transitory computer-readable medium storing code for wireless communication, the code comprising instructions executable by a processor to perform the method of one or more Aspects of Aspects 1-26.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving configuration information for a plurality of carriers, wherein a set of first carriers of the plurality of carriers are single transmit receive point (single-TRP) carriers and a set of second carriers of the plurality of carriers are multi-TRP carriers;
determining, for the plurality of carriers, a distribution that satisfies a per-span capability of the UE, wherein the distribution is of at least one of a plurality of non-overlapped control channel elements (CCEs) or a plurality of blind decodes, wherein the distribution is based at least in part on which carriers, of the plurality of carriers, are single-TRP carriers or multi-TRP carriers, and wherein the distribution is further based at least in part on a rule indicating that, for a given span associated with a given subcarrier spacing, a given physical downlink control channel configuration, and an alignment of search space sets with a given span configuration, across the set of first carriers or the set of second carriers, the UE is not to receive a number of non-overlapped CCEs or perform a number of blind decodes that exceeds a determined number of blind decodes or non-overlapped CCEs; and
receiving communications on the plurality of carriers in accordance with the distribution.

2. The method of claim 1, wherein the single-TRP carriers are associated with respective single control resource set pool indexes and the multi-TRP carriers are each associated with respective pluralities of control resource set pool indexes.

3. The method of claim 1, wherein a number of carriers, of the plurality of carriers, exceeds a threshold associated with a monitoring capability of the UE, wherein the monitoring capability is for span-based monitoring of the plurality of carriers, and wherein determining the distribution is based at least in part on the number of carriers exceeding the threshold.

4. The method of claim 1, wherein the rule indicates that, for a given span associated with a given subcarrier spacing, a given physical downlink control channel configuration, and an alignment of search space sets with a given span configuration, across the set of first carriers, the UE is not to receive a number of non-overlapped CCEs or perform a number of blind decodes that exceeds the determined number of blind decodes or non-overlapped CCEs which is a minimum of:
a maximum number of blind decodes or non-overlapped CCEs indicated by the per-span capability for the given span, and
a maximum total number of blind decodes or non-overlapped CCEs across respective spans of the plurality of carriers.

5. The method of claim 1, wherein the rule is used to determine the distribution based at least in part on a number of the plurality of carriers exceeding a carrier capability of the UE.

6. The method of claim 1, wherein the rule indicates that, for a given span associated with a given subcarrier spacing, a given physical downlink control channel configuration, and an alignment of search space sets with a given span configuration, across the set of second carriers, the UE is not to receive a number of non-overlapped CCEs or perform a number of blind decodes that exceeds the determined number of blind decodes or non-overlapped CCEs which is a minimum of:
a maximum number of blind decodes or non-overlapped CCEs indicated by the per-span capability for the given span, scaled by a factor, and
a maximum total number of blind decodes or non-overlapped CCEs across respective spans of the plurality of carriers, scaled by the factor.

7. The method of claim 1, wherein the rule is used to determine the distribution based at least in part on a number of the plurality of carriers exceeding a carrier capability of the UE.

8. The method of claim 6, wherein the factor is based at least in part on a capability of the UE associated with communicating using a plurality of control resource set pool indexes.

9. The method of claim 6, wherein the respective spans comprise a combination of a first span on a first carrier, of the plurality of carriers, and a second span on a second carrier of the plurality of carriers.

10. The method of claim 6, wherein the respective spans comprise a first span on a first carrier, of the plurality of carriers, and a second span on a second carrier, of the plurality of carriers, wherein the second span at least partially overlaps the first span.

11. The method of claim 10, wherein the second span starts with a same symbol as the first span.

12. The method of claim 6, further comprising determining the maximum total number of blind decodes or non-overlapped CCEs across respective spans of the plurality of carriers based at least in part on the maximum number of blind decodes or non-overlapped CCEs across respective spans of the plurality of carriers.

13. The method of claim 1, wherein the determination is based at least in part on one or more spans for which overbooking or dropping is permitted.

14. The method of claim 13, wherein the one or more spans are associated with a primary carrier of the plurality of carriers, wherein the one or more spans are associated with a control resource set (CORESET) with an index of zero, and wherein the one or more spans are associated with a CORESET pool index that is not configured or that is zero.

15. The method of claim 13, wherein the one or more spans are fixed.

16. The method of claim 1, wherein the distribution is determined based at least in part on counting a number of carriers of the plurality of carriers,
wherein a second carrier, of the set of second carriers, is associated with search space sets, of two or more different differentiation parameters, that align with at least two different span configurations, and
wherein, for counting the number of carriers, the second carrier is counted as at least two single-TRP carriers in accordance with a number of the at least two different span configurations.

17. The method of claim 16, wherein the at least two single-TRP carriers are counted based at least in part on corresponding span configurations of the at least two different span configurations.

18. The method of claim 1, wherein the distribution is determined based at least in part on counting a number of carriers of the plurality of carriers, wherein a second carrier, of the set of second carriers, is associated with search space sets, of two or more different differentiation parameters, that align with a single span configuration, and wherein, for counting the number of carriers, the second carrier is counted as one multi-TRP carrier based at least in part on the second carrier being aligned with the single span configuration.

19. The method of claim 1, wherein the distribution is determined based at least in part on counting a number of carriers of the plurality of carriers, wherein a first carrier, of the set of first carriers, is associated with search space sets, of a single differentiation parameter, that align with a single span configuration, and wherein, for counting the number of carriers, the first carrier is counted as one single-TRP carrier based at least in part on the first carrier being aligned with the single span configuration.

20. The method of claim 1, wherein the set of first carriers are associated with respective single differentiation parameters and the set of second carriers are associated with respective groups of two or more differentiation parameters.

21. The method of claim 20, wherein the respective single differentiation parameters and the groups of two or more differentiation parameters comprise control resource set pool indexes.

22. The method of claim 20, wherein the respective single differentiation parameters and the groups of two or more differentiation parameters comprise respective timing capability indications of the set of first carriers and the set of second carriers.

23. The method of claim 1, wherein the determination of the distribution is based at least in part on scaling the per-span capability by a factor relating to a multi-TRP capability of the UE to generate a scaled per-span capability, and wherein the distribution is based at least in part on allocating the scaled per-span capability to the plurality of carriers.

24. The method of claim 1, wherein the distribution is determined based at least in part on counting a number of carriers of the plurality of carriers, and wherein, for counting the number of carriers, a second carrier, of the plurality of carriers, is selectively counted as a multi-TRP carrier or multiple single-TRP carriers.

25. A method of wireless communication performed by a base station, comprising:

transmitting, to a user equipment (UE), configuration information for a plurality of carriers, wherein a set of first carriers of the plurality of carriers are single-transmit receive point (TRP) carriers and a set of second carriers of the plurality of carriers are multi-TRP carriers;

determining, for the plurality of carriers, a distribution that satisfies a per-span capability of the UE, wherein the distribution is of at least one of a plurality of non-overlapped control channel elements (CCEs) or a plurality of blind decodes, wherein the distribution is based at least in part on which carriers, of the plurality of carriers, are single-TRP carriers or multi-TRP carriers, and wherein the distribution is further based at least in part on a rule indicating that, for a given span associated with a given subcarrier spacing, a given physical downlink control channel configuration, and an alignment of search space sets with a given span configuration, across the set of first carriers or the set of second carriers, the UE is not to receive a number of non-overlapped CCEs or perform a number of blind decodes that exceeds a determined number of blind decodes or non-overlapped CCEs; and transmitting communications on the plurality of carriers in accordance with the distribution.

26. The method of claim 25, wherein the single-TRP carriers are associated with respective single control resource set pool indexes and the multi-TRP carriers are each associated with respective pluralities of control resource set pool indexes.

27. A user equipment (UE) for wireless communication, comprising:

a memory; and one or more processors operatively coupled to the memory, the memory and the one or more processors configured to:

receive configuration information for a plurality of carriers, wherein a set of first carriers of the plurality of carriers are single transmit receive point (single-TRP) carriers and a set of second carriers of the plurality of carriers are multi-TRP carriers;

determine, for the plurality of carriers, a distribution that satisfies a per-span capability of the UE, wherein the distribution is of at least one of a plurality of non-overlapped control channel elements (CCEs) or a plurality of blind decodes, wherein the distribution is based at least in part on which carriers, of the plurality of carriers, are single-TRP carriers or multi-TRP carriers, and wherein the distribution is further based at least in part on a rule indicating that, for a given span associated with a given subcarrier spacing, a given physical downlink control channel configuration, and an alignment of search space sets with a given span configuration, across the set of first carriers or the set of second carriers, the UE is not to receive a number of non-overlapped CCEs or perform a number of blind decodes that exceeds a determined number of blind decodes or non-overlapped CCEs; and receive communications on the plurality of carriers in accordance with the distribution.

28. The UE of claim 27, wherein a number of carriers, of the plurality of carriers, exceeds a threshold associated with a monitoring capability of the UE, wherein the monitoring capability is for span-based monitoring of the plurality of carriers, and wherein determining the distribution is based at least in part on the number of carriers exceeding the threshold.

29. A base station for wireless communication, comprising:

a memory; and one or more processors operatively coupled to the memory, the memory and the one or more processors configured to:

transmit, to a user equipment (UE), configuration information for a plurality of carriers, wherein a set of first carriers of the plurality of carriers are single-transmit receive point (TRP) carriers and a set of second carriers of the plurality of carriers are multi-TRP carriers;

determine, for the plurality of carriers, a distribution that satisfies a per-span capability of the UE, wherein the distribution is of at least one of a plurality of non-overlapped control channel elements (CCEs) or a plurality of blind decodes, wherein the distribution is based at least in part on which carriers, of the plurality of carriers, are single-TRP carriers or multi-TRP carriers, and wherein the distribution is further based at least in part on a rule indicating that, for a given span associated with a given subcarrier spacing, a given physical downlink control channel configuration, and an alignment of search space sets with a given span configuration, across the set of first carriers or the set of second carriers, the UE is not to receive a number of non-overlapped CCEs or perform a number of blind decodes that exceeds a determined number of blind decodes or non- overlapped CCEs; and transmit communications on the plurality of carriers in accordance with the distribution.

30. The base station of claim 29, wherein a number of carriers, of the plurality of carriers, exceeds a threshold associated with a monitoring capability of the UE, wherein the monitoring capability is for span-based monitoring of the plurality of carriers, and wherein determining the distribution is based at least in part on the number of carriers exceeding the threshold.

* * * * *